US008113531B2

(12) United States Patent
Zhou et al.

(10) Patent No.: US 8,113,531 B2
(45) Date of Patent: Feb. 14, 2012

(54) PERSONAL MOBILITY VEHICLE HAVING A PIVOTING SUSPENSION WITH A TORQUE ACTIVATED RELEASE MECHANISM

(75) Inventors: Daniel Z. Zhou, Fresno, CA (US); Mark A. Jackson, Fresno, CA (US); John J. Tarter, Fresno, CA (US); Mark E. Greig, Longmont, CO (US); Rex W. Stevens, Longmont, CO (US); James M. Koerlin, Broomfield, CO (US); Samuel D. Traxinger, Fresno, CA (US); Allen B. Killebrew, Longmont, CO (US)

(73) Assignee: Sunrise Medical HHG, Inc., Longmont, CO (US)

( * ) Notice: Subject to any disclaimer, the term of this patent is extended or adjusted under 35 U.S.C. 154(b) by 297 days.

(21) Appl. No.: 12/333,102

(22) Filed: Dec. 11, 2008

(65) Prior Publication Data

US 2009/0145677 A1 Jun. 11, 2009

Related U.S. Application Data

(63) Continuation-in-part of application No. 11/504,968, filed on Aug. 16, 2006, now Pat. No. 7,896,394.

(60) Provisional application No. 61/007,137, filed on Dec. 11, 2007.

(51) Int. Cl.
*B62D 61/12* (2006.01)

(52) U.S. Cl. .................... 280/304.1; 180/65.1; 180/209; 180/907; 280/250.1

(58) Field of Classification Search ........... 280/124.128, 280/47.38, 250.1, 755, 124.164, 767, 124.1, 280/4.07, 59, 60, 124.04, 754, 124.116, 124.118, 280/86.1, 87.043, 304.5, 296, 292, 291, 304.1; 180/65.1, 209, 24.07, 59, 907; 297/DIG. 4
See application file for complete search history.

(56) References Cited

U.S. PATENT DOCUMENTS

| | | | |
|---|---|---|---|
| 2,934,157 | A | 4/1960 | Harp |
| 3,520,378 | A | 7/1970 | Slay |
| 3,953,054 | A | 4/1976 | Udden et al. |
| 4,128,137 | A | 12/1978 | Booth |

(Continued)

FOREIGN PATENT DOCUMENTS

| | | | |
|---|---|---|---|
| CA | 2254372 | A1 | 5/2000 |

(Continued)

*Primary Examiner* — J. Allen Shriver, II
*Assistant Examiner* — James Triggs
(74) *Attorney, Agent, or Firm* — MacMillan, Sobanski & Todd, LLC

(57) ABSTRACT

A personal mobility vehicle includes an base unit having a frame and front and rear pivot arms pivotally mounted at respective front and rear pivot points. The front and rear pivot arms support casters. A drive unit having a ground engaging mid-wheel drive wheel is connected to the frame. A linkage connects the front and rear pivot arms to each other in a manner such that an upward or downward rotation of one of the pivot arms about its pivot point causes rotation of the other pivot arm about its pivot point in an opposite rotational direction. The base unit may also include a drive unit that is pivotally supported on the base unit by a torque arm and a suspension system that includes a suspension stop. The torque arm selectively disengages the suspension stop to allow movement of the front caster wheel in response to the terrain traversed.

16 Claims, 15 Drawing Sheets

U.S. PATENT DOCUMENTS

| | | | | |
|---|---|---|---|---|
| 4,245,847 | A | 1/1981 | Knott | |
| 4,310,167 | A | 1/1982 | McLaurin | |
| 5,964,473 | A | 10/1999 | Degonda et al. | |
| 6,070,898 | A | 6/2000 | Dickie et al. | |
| 6,129,165 | A * | 10/2000 | Schaffner et al. | 180/65.1 |
| 6,279,927 | B1 | 8/2001 | Nishihira et al. | |
| 6,352,273 | B1 | 3/2002 | Dickie | |
| 6,454,286 | B1 * | 9/2002 | Hosino | 280/250.1 |
| 6,851,711 | B2 * | 2/2005 | Goertzen et al. | 280/755 |
| 6,923,278 | B2 * | 8/2005 | Mulhern et al. | 180/65.1 |
| 6,935,448 | B2 | 8/2005 | Goertzen et al. | |
| 6,938,923 | B2 | 9/2005 | Mulhern et al. | |
| 7,066,290 | B2 * | 6/2006 | Fought | 180/65.51 |
| 7,083,195 | B2 | 8/2006 | Goertzen | |
| 7,219,755 | B2 | 5/2007 | Goertzen et al. | |
| 7,293,801 | B2 * | 11/2007 | Bertrand et al. | 280/755 |
| 7,316,282 | B2 * | 1/2008 | Mulhern et al. | 180/65.1 |
| 7,344,155 | B2 * | 3/2008 | Mulhern et al. | 280/755 |
| 7,374,002 | B2 * | 5/2008 | Fought | 180/65.51 |
| 7,389,835 | B2 * | 6/2008 | Mulhern et al. | 180/22 |
| 7,413,038 | B2 * | 8/2008 | Mulhern et al. | 180/22 |
| 7,506,709 | B2 * | 3/2009 | Kiwak et al. | 180/65.1 |
| 7,597,163 | B2 * | 10/2009 | Goertzen et al. | 180/65.1 |
| 7,726,689 | B2 * | 6/2010 | Mulhern et al. | 280/755 |
| 7,775,307 | B2 * | 8/2010 | Cheng | 180/22 |
| 7,828,310 | B2 * | 11/2010 | Vreeswijk et al. | 280/250.1 |
| 7,942,445 | B2 * | 5/2011 | Kramer et al. | 280/755 |
| 2001/0002081 | A1 * | 5/2001 | Toppses | 280/250.1 |
| 2004/0004342 | A1 * | 1/2004 | Mulhern et al. | 280/304.1 |
| 2004/0032119 | A1 * | 2/2004 | Tran et al. | 280/755 |
| 2004/0094944 | A1 * | 5/2004 | Goertzen et al. | 280/755 |
| 2004/0150204 | A1 * | 8/2004 | Goertzen et al. | 280/755 |
| 2004/0262859 | A1 * | 12/2004 | Turturiello et al. | 280/5.515 |
| 2005/0127631 | A1 * | 6/2005 | Schaffner | 280/124.1 |
| 2005/0206124 | A1 * | 9/2005 | Levi et al. | 280/304.1 |
| 2005/0206149 | A1 * | 9/2005 | Mulhern et al. | 280/755 |
| 2006/0021806 | A1 * | 2/2006 | Goertzen et al. | 180/65.1 |
| 2006/0022445 | A1 * | 2/2006 | Mulhern et al. | 280/755 |
| 2006/0097478 | A1 * | 5/2006 | Goertzen et al. | 280/304.1 |
| 2006/0249317 | A1 * | 11/2006 | Fought | 180/65.1 |

FOREIGN PATENT DOCUMENTS

| | | | |
|---|---|---|---|
| DE | 10027752 | A1 | 12/2001 |
| EP | 1522295 | A2 | 4/2005 |
| FR | 2399822 | A1 | 3/1979 |
| FR | 2738147 | A3 | 3/1997 |
| JP | 2000102569 | A | 4/2000 |
| JP | 2000288032 | A | 10/2000 |
| WO | W09006097 | A1 | 6/1990 |
| WO | W09615752 | A1 | 5/1996 |

* cited by examiner

PERSONAL MOBILITY VEHICLE HAVING A PIVOTING SUSPENSION WITH A TORQUE ACTIVATED RELEASE MECHANISM

CROSS-REFERENCE TO RELATED APPLICATIONS

This application is a Continuation-In-Part Application of U.S. patent application Ser. No. 11/504,968, filed Aug. 16, 2006, now U.S. Pat. No. 7,896,394, issued Mar. 1, 2011 and entitled MIDWHEEL DRIVE WHEELCHAIR WITH INDEPENDENT FRONT AND REAR SUSPENSION, which claimed priority from U.S. Provisional Patent Application Ser. No. 60/709,307, filed Aug. 18, 2005, entitled MIDWHEEL DRIVE WHEELCHAIR WITH INDEPENDENT FRONT AND REAR SUSPENSION, and also from U.S. Provisional Patent Application Ser. No. 60/799,529, filed May 11, 2006, entitled MIDWHEEL DRIVE WHEELCHAIR WITH INDEPENDENT FRONT AND REAR SUSPENSION; and also claims the benefit of U.S. Provisional Application No. 61/007,137, filed Dec. 11, 2007, the disclosures of which are incorporated by reference in their entirety.

BACKGROUND OF THE INVENTION

This invention relates in general to suspension systems for use with personal mobility vehicles. In particular, this invention relates to a pivoting suspension system having a torque actuated suspension release mechanism for use with a powered wheelchair.

Power-driven personal mobility vehicles are known in the art and may include vehicles such as, for example, scooters and wheelchairs. Some power-driven personal mobility vehicles, particularly certain configurations of power-driven wheelchairs, are known to include suspension systems to improve ride and stability characteristics. One type of power-driven, personal mobility vehicle is a center drive wheelchair that typically includes a base unit having a frame, two spaced-apart drive wheels, and a plurality of caster wheels. The drive wheels are located generally near the longitudinal center of the base. The caster wheels are usually supported on longitudinally extending suspension arms that may be mounted for pivotal movement relative to the frame. The base may include a suspension system to control the relative movement of the drive wheels and the caster wheels in reaction to obstacles or uneven terrain. In some center drive wheelchair configurations, the drive motor is connected to the caster suspension arm in order to urge the arm and caster wheel over an obstacle. Such drive motor and suspension arm arrangements rely on the torque reaction of the motor to lift the caster wheel over the obstacle. The lifting movement of the suspension arm is typically in an upward direction toward the wheelchair seat. The motor engages the suspension arm and transfers the torque reaction load to the suspension arm, to urge it in an upward direction by the reaction force of the motor.

SUMMARY OF THE INVENTION

This invention relates to a wheelchair having a frame and a front pivot arm pivotally mounted to the frame at a front pivot point, the front pivot arm having a caster for supporting the frame. A rear pivot arm is pivotally mounted to the frame at a rear pivot point, the rear pivot arm having a caster for supporting the frame. A ground engaging mid-wheel drive wheel is connected to the frame. A linkage connects the front and rear pivot arms to each other in a manner such that an upward or downward rotation of one of the pivot arms about its pivot point causes rotation of the other pivot arm about its pivot point in an opposite rotational direction.

According to this invention there is also provided a wheelchair having a frame, a ground engaging mid-wheel drive wheel connected to the frame, and a front pivot arm pivotally mounted to the frame at a front pivot point, the front pivot arm having a caster for supporting the frame, the front pivot arm being independent of the drive wheel. A rear pivot arm is pivotally mounted to the frame at a rear pivot point, the rear pivot arm having a caster for supporting the frame, the rear pivot arm being independent of the drive wheel. A linkage connects the front and rear pivot arms to each other in a manner such that an upward or downward rotation of one of the pivot arms about its pivot point causes rotation of the other pivot arm about its pivot point in an opposite rotational direction.

According to this invention there is also provided a wheelchair that has a frame, a front pivot arm pivotally mounted to the frame at a front pivot point, the front pivot arm having a caster for supporting the frame, and a rear pivot arm pivotally mounted to the frame at a rear pivot point, the rear pivot arm having a caster for supporting the frame. A ground engaging mid-wheel drive wheel is connected to the frame. The front and rear pivot arms are configured in a manner such that an upward or downward rotation of one of the pivot arms about its pivot point causes rotation of the other pivot arm about its pivot point in an opposite rotational direction.

This invention further relates to a suspension system for a wheelchair that includes a frame, and a suspension unit including a front suspension arm pivotally supported on the frame. A front caster wheel is mounted on the front suspension arm for relative pivotal movement therewith. A torque arm pivotally supports a drive unit relative to the frame. The torque arm including a suspension lock portion that selectively engages the suspension unit such that when the drive unit pivots relative to the frame the suspension lock portion becomes disengaged from the suspension unit, thereby enabling the front suspension arm to pivot relative to the frame.

According to this invention there is described herein a suspension system for a wheelchair including a base having a frame. A drive unit, having a motor and a gear box, is connected to a drive wheel for rotation of the drive wheel relative to the base. The drive unit supported by a torque arm for pivotal movement relative to the frame. The torque arm includes a suspension lock portion. A suspension unit includes a front suspension arm that is pivotally supported on the frame and a front caster wheel mounted on the front suspension arm for relative pivotal movement. The suspension lock portion of the torque arm is movable, upon rotation of the torque arm, into and out of selective engagement with the suspension unit such that torque applied to the drive wheel selectively disengages the suspension lock portion from the suspension unit.

The invention still further relates to a suspension system for a wheelchair that includes a base unit and a front caster wheel mounted on a front suspension arm that is pivotally mounted to the base unit. A torque arm supports a drive wheel and a motor. The torque arm is pivotally mounted to the base unit in a manner that enables the torque arm to pivot when the motor generates torque. The torque arm is configured for selective engagement with the front suspension arm to selectively block pivoting of the front suspension arm.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
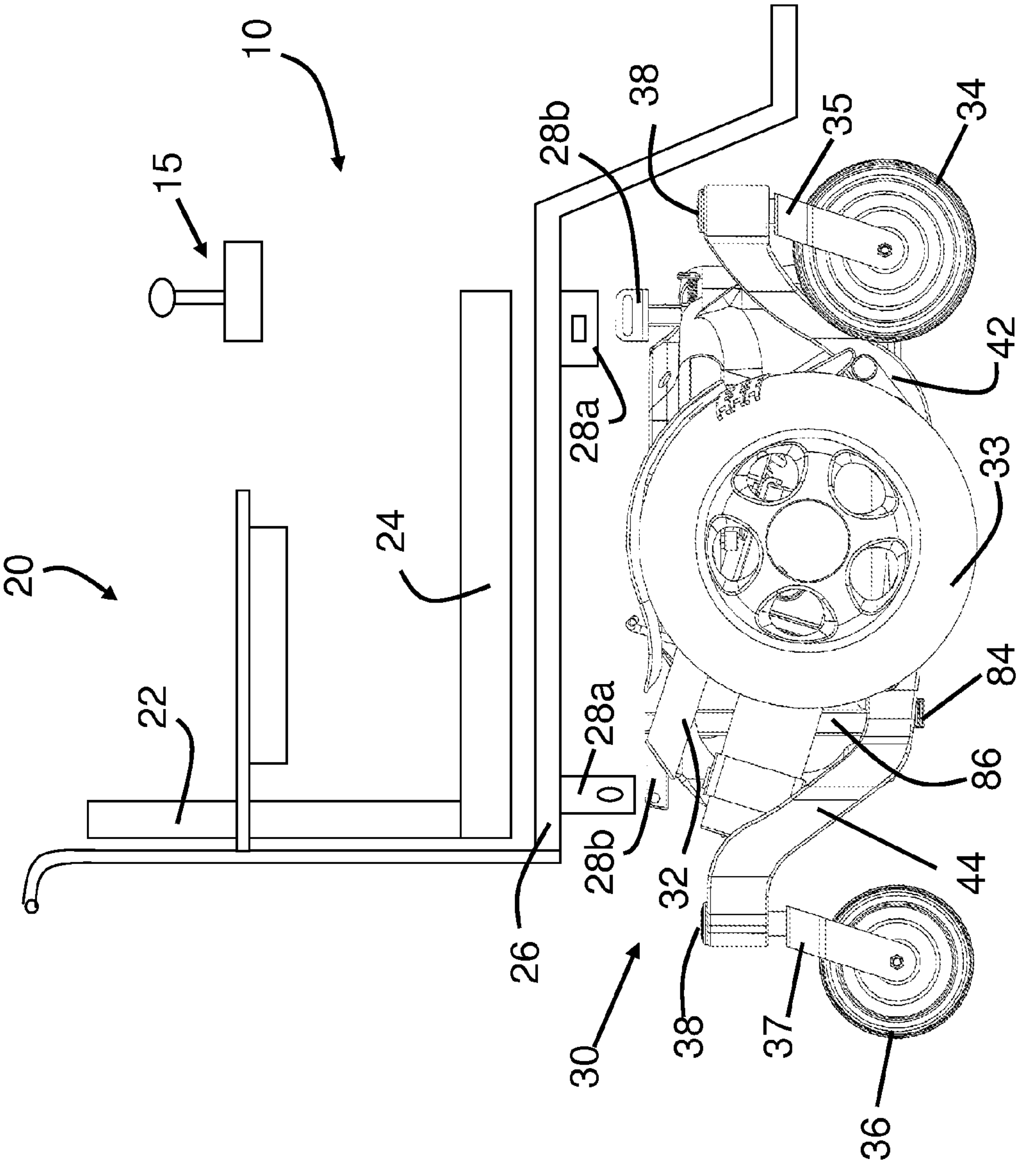
FIG. 1 is an exploded, side elevational view of a personal mobility vehicle including a base unit having a suspension system.

Referring now to the drawings, there is illustrated in FIG. 1 a power-driven wheelchair 10 that includes a control device 15, a seating system 20, and a power-driven base unit 30. Though described in the context of a power-driven wheelchair 10, the various embodiments may be used in any environment for the purposes described below. The control device 15 may be a joystick, examples of which are known in the art, to provide an interface between the user and the power-driven base 30 for operation of the wheelchair 10. The seating system 20 includes a seat back 22, a seat base 24, and a seat frame 26. The seating system 20 may be mounted to the power-driven base unit 30 by cooperating mounting points 28*a* and 28*b*, though any type of connection may be provided if desired.

Figure 2:
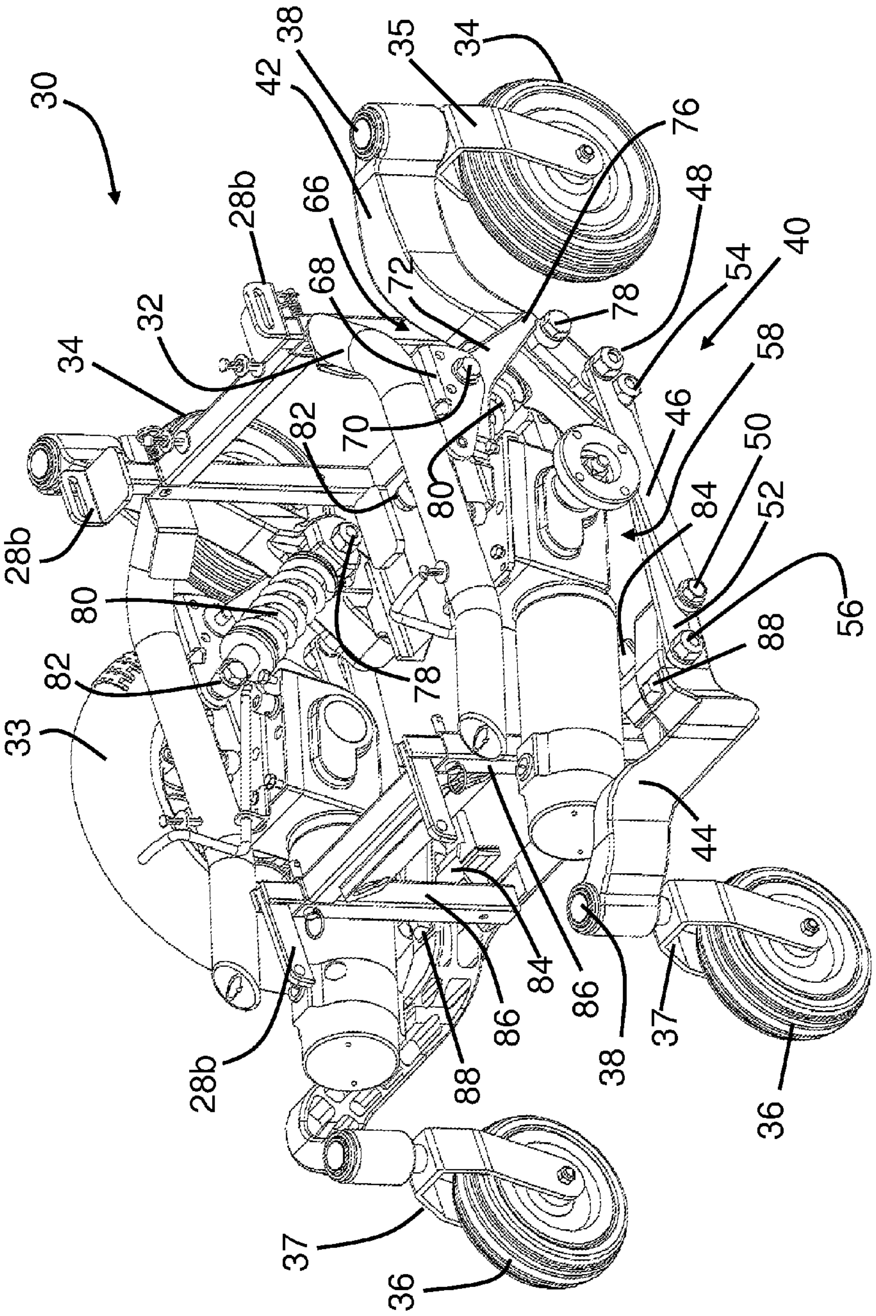
FIG. 2 is a perspective view of the base unit of the personal mobility vehicle of FIG. 1.

The base unit 30 includes a frame 32 that supports a pair of spaced-apart drive wheels 33, though only one is shown in FIGS. 1 and 2. The base unit 30 also includes front caster wheels 34 and rear caster wheels 36. The front caster wheel 34 is supported by a front fork 35 for rotational and pivot movement relative to the base unit 30. In a similar manner, the rear caster wheel is supported by a rear fork 37 for rotational and pivot movement relative to the base unit 30. A pivot head assembly 38 may provide pivotal movement of the front and rear forks 35 and 37, respectively, by way of bearings or bushing elements. FIG. 2 shows the base unit 30 with one of the drive wheels 33 removed to reveal a suspension unit 40. The suspension unit 40 is shown and will be described as a right side suspension unit 40. It is to be understood that a mirror image, left side suspension unit is provided on the opposite side of the base unit 30. The right and left side suspension units 40 operate the same manner and may also move independently of each other.

Figure 3A:
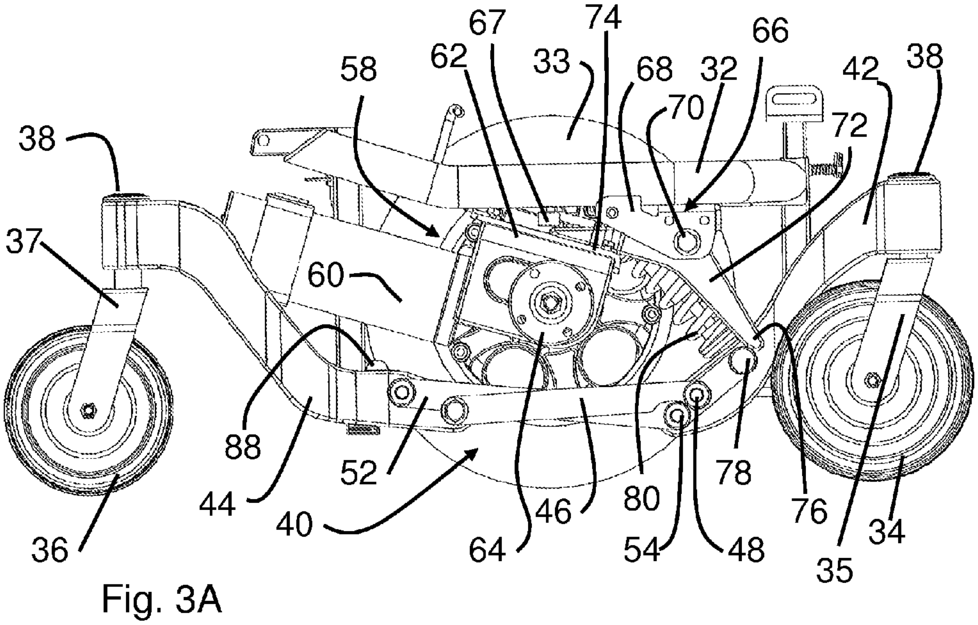
FIG. 3A is a side elevational view of the base unit of FIG. 2.
Figure 3B:
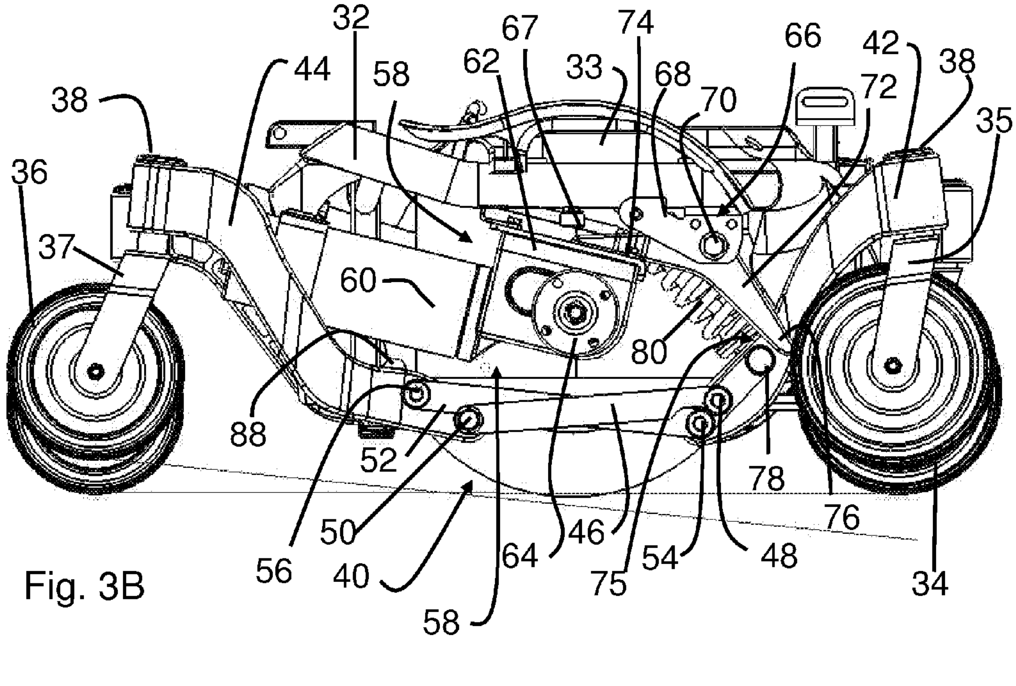
FIG. 3B is a side elevational view of the base of FIG. 3A showing the suspension system in a deflected condition.
Figure 4:
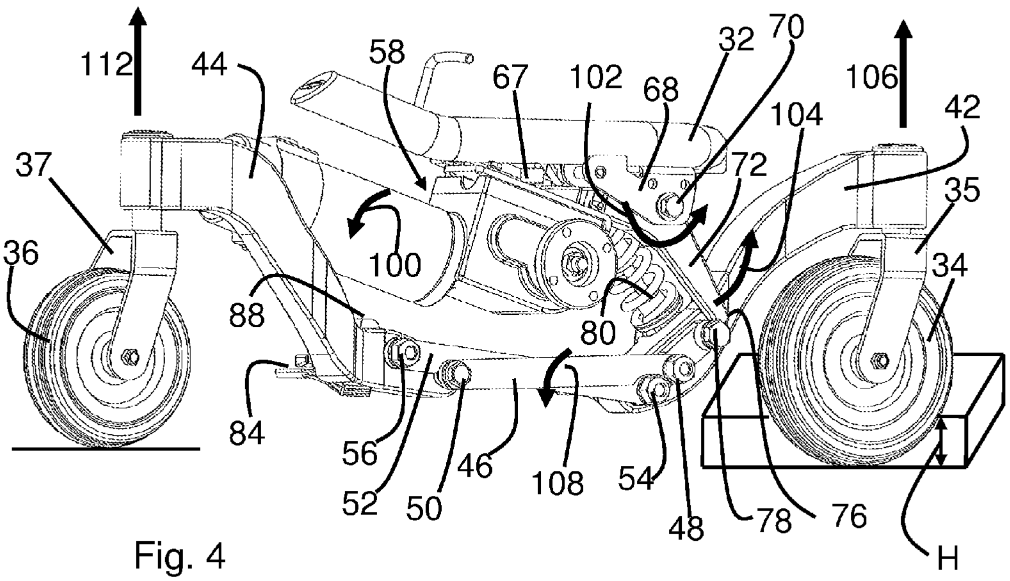
FIG. 4 is a perspective view of a suspension system portion of the base unit of FIG. 3 showing the relative movement of components of the suspension system.

As shown in FIGS. 2 and 3, the suspension unit 40 includes a front suspension arm 42 that supports the front fork 35, by way of the pivot head 38, to allow pivotal movement of the front caster wheels 34 about a vertical axis. The suspension unit 40 further includes a rear suspension arm 44 that, likewise, supports the rear fork 37, by way of the pivot head 38, to allow pivotal movement of the rear caster wheels 36 about a vertical axis. The embodiment shown in FIG. 2 includes a first link arm 46 that is connected between the front and rear suspension arms 42 and 44 by first and second pivot points 48 and 50. A second link arm 52 is fixed between the front and rear suspension arms 42 and 44 by mounting points 54 and 56. The first and second link arms 46 and 52 provide coordinated movement of the rear suspension arm 44 when the front suspension arm 42 moves in reaction to an obstruction, as shown in FIG. 4 and as will be explained in detail below. The front and rear suspension arms 42 and 44 are coordinated for concurrent or simultaneous movement when the obstruction is encountered. In other words, when the front suspension arm 42 is urged up to overcome an obstacle the rear suspension arm 44 also moves in a similar direction at the same time. Additionally, the front and rear suspension arms 42 and 44 may move concurrently during any articulation, though such is not required. A similar suspension unit is disclosed in U.S. Published Patent Application No. 2007/0039766, published Feb. 22, 2007, which is hereby incorporated by reference in its entirety.

The distance between the pivot point 48 and the mounting point 54 of the front suspension arm may be varied to produce a different amount of movement, or a suspension deflection ratio, between the front and rear suspension arms 42 and 44. This suspension deflection ratio may compensate for differences in length, or other differences, between the front and the rear suspension arms 42 and 44 to raise both caster wheels 34 and 36 off of the ground by the same amount. Likewise, the distance between the pivot point 50 and mounting point 56 of the rear suspension arm may be varied in a similar manner to produce the same effect. Alternatively, the pivot points and mounting points 48, 54 and/or 50, 56 may be varied to allow the rear suspension arm 44 to move by a different amount in reaction to movement of the front suspension arm 42.

The base unit 30 further includes a drive unit, shown generally at 58. The drive unit 58 includes a motor 60 and a gear box 62, examples of which are known in the art. The motor 60 engages the gear box 62 to provide rotational movement of the drive wheel 33 in response to commands from the control device 15. The drive unit 58 is illustrated as a right side drive unit and it should be understood that a corresponding, mirror-image left drive unit is also provided. The control device 15 coordinates the right and left drive units 58 to provide direction and propulsion to the wheelchair 10 in response to the control device 15. A wheel flange 64 is coupled to and extends from the gear box 62 to support the drive wheel 33 for rotation.

The gear box 62 is shown connected to the frame 32 by a drive unit mount, shown generally at 66. A motor stop 67 is positioned between the frame 32 and the drive unit 58. The motor stop 67 is illustrated as a cylindrical protrusion connected to the frame 32 by a bolt, though any suitable structure may be used to limit movement of the drive unit 58. The drive unit mount 66 includes a bracket 68 that is fixed to the frame 32. The fixed bracket 68 includes a pivot point 70 that supports a torque arm 72 for relative pivotal movement therewith. The torque arm 72 is illustrated as an angled bracket structure having a drive mount portion 74 and a suspension lock portion 76. The drive unit 50 is mounted on the drive mount portion 74. The torque arm 72, however, may be any structure suitable to pivotally support the drive unit 58 and selectively prevent movement of the suspension unit 40, if desired.

The suspension lock portion 76 selectively contacts a suspension stop 78. When the suspension lock portion 76 of the torque arm 72 contacts the suspension stop 78, movement of the front and rear suspension arms 42 and 44, in an upward vertical direction toward the seat 24 and relative to the base frame 32, is prevented. In other words, when the suspension lock portion 76 of the torque arm 72 contacts the suspension stop 78, the front casters 34 are substantially prevented from being raised off the ground. The suspension stop 78 is illustrated as a cylindrical protruding knob that is bolted to the front suspension arm 42. The suspension stop 78, however, may be any structure or component feature, connected to or integrally formed with a portion of the suspension unit, to restrict or permit suspension movement in response to the torque reaction of the drive unit 58. For example, the suspension stop 78 may be a point directly on the front suspension arm 42, the rear suspension arm 44, or any of the link arms 46 and 52, if desired. The suspension stop 78 may further be configured as a bearing element such that when the suspension lock portion 76 is moved slightly out of the locking position, the suspension stop 78 may be in general rolling contact against a lower portion of the torque arm 70.

When the suspension lock portion 76 is pivoted away from the suspension stop 78, the front and rear suspension arms 42 and 44 are permitted to articulate in reaction to encountered terrain irregularities. A spring/damper mechanism, shown as a shock absorber 80, is connected between the base frame 32 and the front suspension arm 42 to provide a reactive suspension force when the wheelchair 10 is driven over obstacles. The shock absorber 80 is pivotally connected to the front suspension arm 42 at the suspension stop 78. The opposite end of the shock absorber 80 is connected to the frame 32 at an upper suspension mount 82, as shown in FIG. 2. The shock absorber 80 may be embodied as any type of suspension mechanism that supports a suspension component for relative movement with respect to the frame. Once the front and rear suspension arms 42 and 44 are free to articulate, the shock absorber 80 compresses during a forward moving encounter with an obstacle. The shock absorber 80 then provides a reactive force to bias the suspension unit 40 to return to a neutral or near-neutral position.

During typical operation of the wheelchair 10 over generally flat or level terrain or in a deceleration condition, the drive unit 58 may contact the motor stop 67, though such is not required. When the wheelchair 10 is moving at a relatively constant speed (i.e. near zero acceleration) or in a decelerating condition, the suspension lock portion 76 of the torque arm 72 engages the suspension stop 78, and the front suspension arm 42 is in a locked position. The engagement of the torque arm 72 against the suspension stop 78 is further made by the weight of the user being transmitted through the suspension unit 40 to the ground. When in the locked position, the reactive movement of the front and rear suspension arms 42 and 44 is restricted. In this position, suspension isolation of minor road irregularities may be provided largely by the seat 24 and the deflection characteristics of the caster wheels 34 and 36 and the drive wheels 33. The caster wheels 34 and 36 and the drive wheels 33 may be provided as pneumatic tires having a soft ride and low force deflection characteristic, though such is not required. The suspension locked position provides the wheelchair 10 with a substantially rigid suspension having a stable ride characteristic over a generally flat or non-obstructed terrain. The tires of the caster wheels 34 and 36 and the drive wheels 33 provide sufficient isolation from minor bumps for rider comfort.

In an alternative embodiment, a gap 75 may be provided between the suspension lock portion 76 and the suspension stop 78 during normal operation. The gap may be in the range of 2-3 millimeters, though any relative spacing may provided if desired. The gap 75 between the suspension lock portion 76 and the suspension stop 78 allows a small amount of movement of the front and rear suspension arms 42 and 44 when the wheelchair 10 is operating at a relatively constant speed (i.e. near zero acceleration) or in a decelerating condition. In this arrangement, the motor stop 67 may be adjusted to contact the drive unit 58 and thus establishing the gap 75 to provide an additional degree of terrain isolation from the shock absorber 80. The gap 75, however, may be provided by other adjustment mechanisms if so desired. Thus, the movement of the front and rear caster wheels 34 and 36 may be controlled by limiting the gap 75 between the suspension locking portion 76 and the suspension stop 78.

Referring now to FIG. 4, the general movements of points of the suspension unit 40 and the drive unit 58 are indicated by various arrows, as will be explained below. These suspension movements are typically encountered when the front caster wheel 34 traverses an obstacle having a height H such as, for example, a door threshold, a curb, or other abrupt surface irregularity. If the height H of the obstacle is high enough, relative to the diameter of the front caster wheel 34, the forces developed to overcome the obstacle will cause the drive unit 58 to pivot, or otherwise move, relative to the frame 32. The movement of the drive unit 58 is a reaction to the torque applied to the drive wheels 33 in order to overcome the inertia of the wheelchair 10 when traversing the obstacle. In an example of operating such a wheelchair 10, the user may drive up to the obstacle and bring the front caster wheel 34 in contact with the obstacle. As the user actuates the joystick 15 to drive the wheelchair 10 over the obstacle, the drive unit 58 increases the torque applied to the drive wheel 33. Since the wheelchair 10 has an inertia due to its mass and the resistance provided to overcome the obstacle, the torque applied to the drive wheels 33 reacts at the drive unit mount 66. In this reaction, as the drive wheel 33 transfers torque to the ground or other surface without slipping, the drive unit 58 applies a reactive load, indicated by arrow 100 in FIG. 4, causing the torque arm 72 to rotate about the pivot point 70 as indicated by arrow 102.

As the torque arm 72 begins to rotate, the suspension lock portion 76 moves away from the suspension stop 78 in a direction indicated by arrow 104. As the suspension lock portion 76 disengages from the suspension stop 78, the blockage of movement of the front suspension arm 42 relative to the frame 32 is removed. With suspension stop 78 released, the front suspension arm 42 is free to move in response to the force from the obstacle and the reaction of the shock absorber 80, similar to conventional reactive suspension systems, examples of which are known in the art. Before the inertia of the wheelchair 10 against the obstacle is overcome, the applied torque causes the drive unit 58 to rotate about the pivot point 70, thus moving the suspension lock portion 76 away from the suspension stop 78. As the drive torque begins to overcome the inertia of the wheelchair 10 against the obstacle, the front suspension arm 42 is free to rotate in a counterclockwise direction about the suspension stop 78, as shown in FIG. 4. The freed movement of the front suspension arm 42 allows the front caster wheel 34 to move generally in the direction of arrow 106 (i.e. up and over the obstacle of height, H). The front caster wheel 34 begins to traverse the obstacle by rising up the distance H. As the front suspension arm 42 rotates counterclockwise (as viewed in the drawings), the link arm 46 moves in the direction of arrow 108, and about the pivot point 48. The link arm 52 functions as a stiffening element and may be fixed to the front and rear suspension arms 42 and 44. The suspension guide 84 may cooperate with a frame component 86, as shown in FIG. 2, to control various movements of the rear suspension arm 44 and may further act to limit suspension travel, though such is not required.

When the front caster wheel 34 is raised up, the link arm actuates the rear suspension arm 44 through pivot points 48 and 50 to move generally in a direction indicated by arrow 112. The upward movement of the rear caster wheel 36 allows the drive wheel 33 to remain loaded by the vehicle/user weight and in sufficient contact with the ground to maintain tractive effort. This prevents slipping of the drive wheels 33 under torque by precluding a bridging effect between the front and rear caster wheels 34 and 36, respectively. As shown in FIGS. 2-4, the drive unit 58 may include a motor limiter 88 that limits the amount of deflection of the drive unit 58 relative to the rear suspension arm 44. The amount of deflection limited by the motor limiter 88 defines a maximum gap between the suspension lock portion 76 and the suspension stop 78 during operation. While illustrated as a boss formed on a portion of the rear suspension arm 44, the motor limiter 88 may be any other structure capable of defining or controlling an upper limit of torque reaction deflection of the drive unit 58. Alternatively, the motor limiter 88 may be adjustable to vary the distance from the motor 60, thus altering the maximum allowable excursion of the drive unit 58. This, in turn, also limits the amount of upward movement of the front and rear suspension arms 42 and 44.

Figure 5:
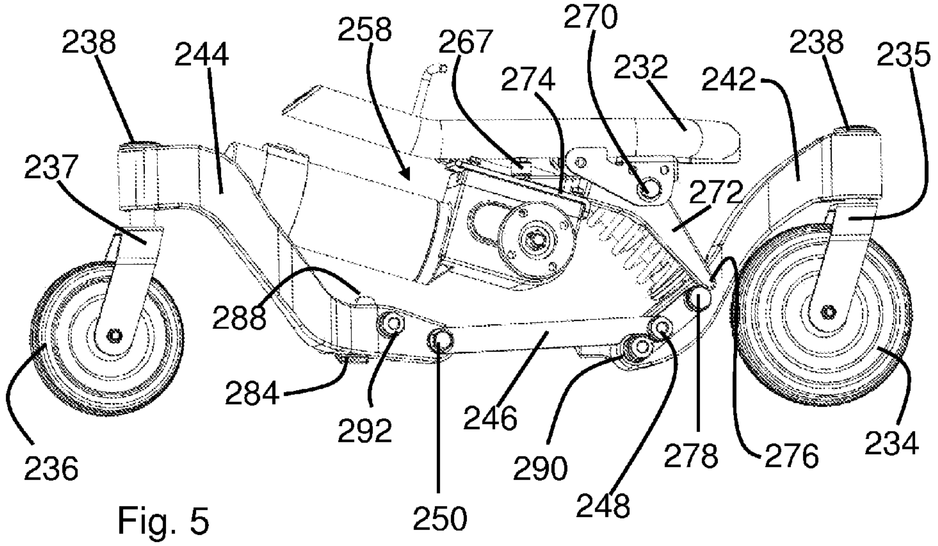
FIG. 5 is a side elevational view, similar to FIG. 3, of another embodiment of a suspension system of a personal mobility vehicle.

Referring now to FIG. 5, there is illustrated another embodiment of a suspension unit, shown generally at 240. The suspension unit 240 is shown in a similar arrangement to the suspension unit 40, described above. Only those elements necessary to provide an understanding of the operation of the suspension unit 240 will be explained in detail. Where possible, similar reference numbers will be used to identify similar features or elements. The suspension unit 240 is supported for relative movement on a base frame 232. The suspension unit 240 includes a front suspension arm 242 that supports a front caster wheel 234 and a front fork 235, as in the embodiment described above. A rear suspension arm 244 supports a rear caster wheel 236 and a rear caster fork 237 in a similar manner. The front suspension arm 242 is connected to the rear suspension arm 244 by a single link arm 246 at a front pivot point 248 and a rear pivot point 250. The front and rear suspension arms 242 and 244 include adjustment points 290 and 292, respectively, though such are not required. The adjustment points 290 and 292 may provide an additional degree of suspension geometry adjustment or to change the rates of relative movement of the front and rear suspension arms 242 and 244. Additionally, the link arm 248 may adjustable, by way of a threaded turnbuckle (not shown) to vary the geometry of the suspension unit 240. A suspension guide 284, similar to suspension guide 84, may be provided as described above, to maintain the path of travel and the position of the rear suspension arm 244.

The embodiment of the suspension unit 240 operates in a manner similar to that of the suspension unit 40 described above. A drive unit 258 is supported by a torque arm 272 for rotation about a pivot point 270. As the drive unit 258 deflects under the torque reaction loads, the torque arm 272 rotates about the pivot point 270. This movement creates or increases a gap between a suspension locking portion 276 and a suspension stop 278 to provide suspension movement, as described above. The suspension movement is controlled by a shock absorber 280 in a manner known in the art. A motor stop 267 may be adjusted to change the contact point of the drive unit 258 relative to the frame 232. The change in this contact point sets a gap between the suspension locking portion 276 and the suspension stop 278 in order to add another degree of isolation.

Figure 6A:
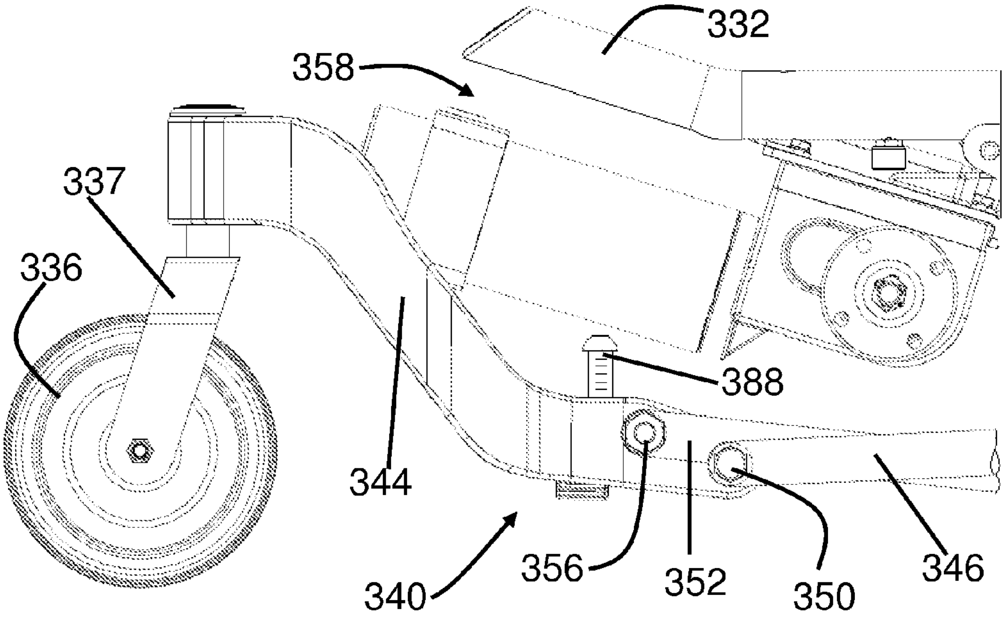
FIG. 6A is a side elevational view of another embodiment of a suspension unit that is part of a suspension system, similar to FIG. 4.

In another embodiment illustrated in FIG. 6A, an adjustable actuating link 388 may be directly connected between a rear suspension arm 344 and a drive unit 358 such that deflection of the drive unit 358 applies an articulating force to the rear suspension arm 344 as the front suspension arm (not shown) is unlocked or freed to react to the obstacle. The adjustable actuating link 388 is illustrated as being located at a pivot point 350. However, the adjustable actuating link 388 may be located generally between a mounting point 356 and the pivot point 350. Additionally, other locations generally at the pivot point end of the rear suspension arm 344 may be used if desired. The articulation force applied to the rear suspension arm 344 by the adjustable actuating link 388 may be added in a progressive manner based on the deflection of the drive unit 358 and the power required to overcome the obstacle. Such an arrangement may define a first range of motion of the drive unit 358 where the suspension lock portion (not shown) moves away from the suspension stop (not shown). This first range of motion enables the front suspension arm to move, or otherwise react, in response to the obstacle. The second range of motion provides contact between the drive unit 358 and the rear suspension arm 344 to add a force component to the suspension unit 340 causing the front suspension arm to be assisted in overcoming the height, H of the obstacle.

Figure 6B:
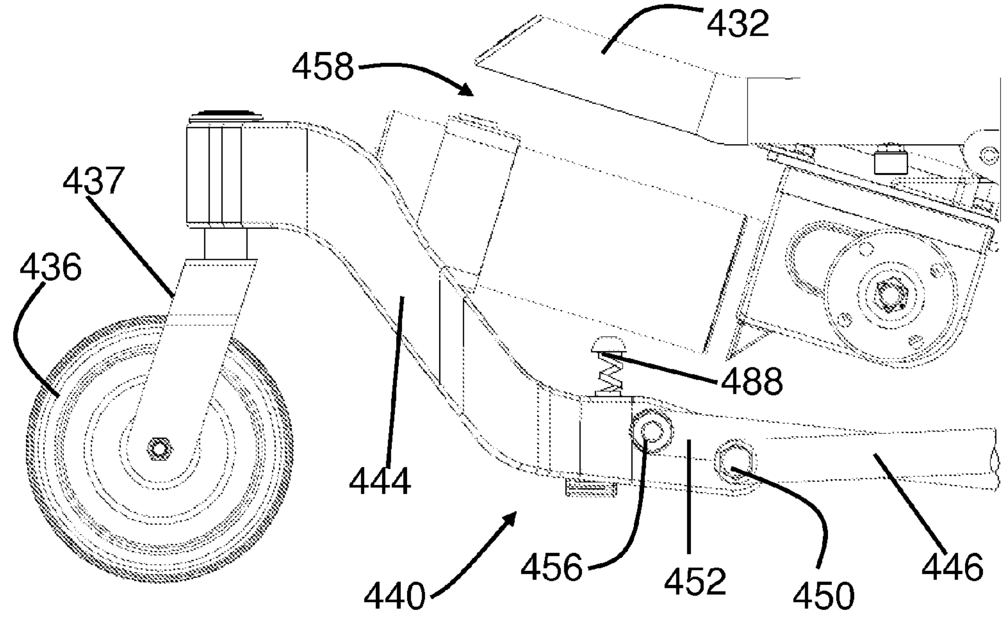
FIG. 6B is a side elevational view of another embodiment of a suspension unit that is part of a suspension system, similar to FIG. 6A.

In another embodiment illustrated in FIG. 6B, a resilient actuating link 488 is shown having a resilient member such as a spring or rubber bumper. The resilient actuating link 488 may provide a proportional transfer of actuation force to a rear suspension arm 444 based on the spring rate of the resilient member portion of the resilient actuating link 488. The drive unit 458 may contact the resilient actuating link 488 and compress the resilient portion thus applying a force that is proportional to the amount of deflection of the resilient actuating link 488. The resilient actuating link 488 is illustrated as being located at a pivot point 450. However, the resilient actuating link 488 may be located generally between a mounting point 456 and the pivot point 450. Additionally, other locations generally at the pivot point end of the rear suspension arm 444 may be used if desired.

Figure 7:
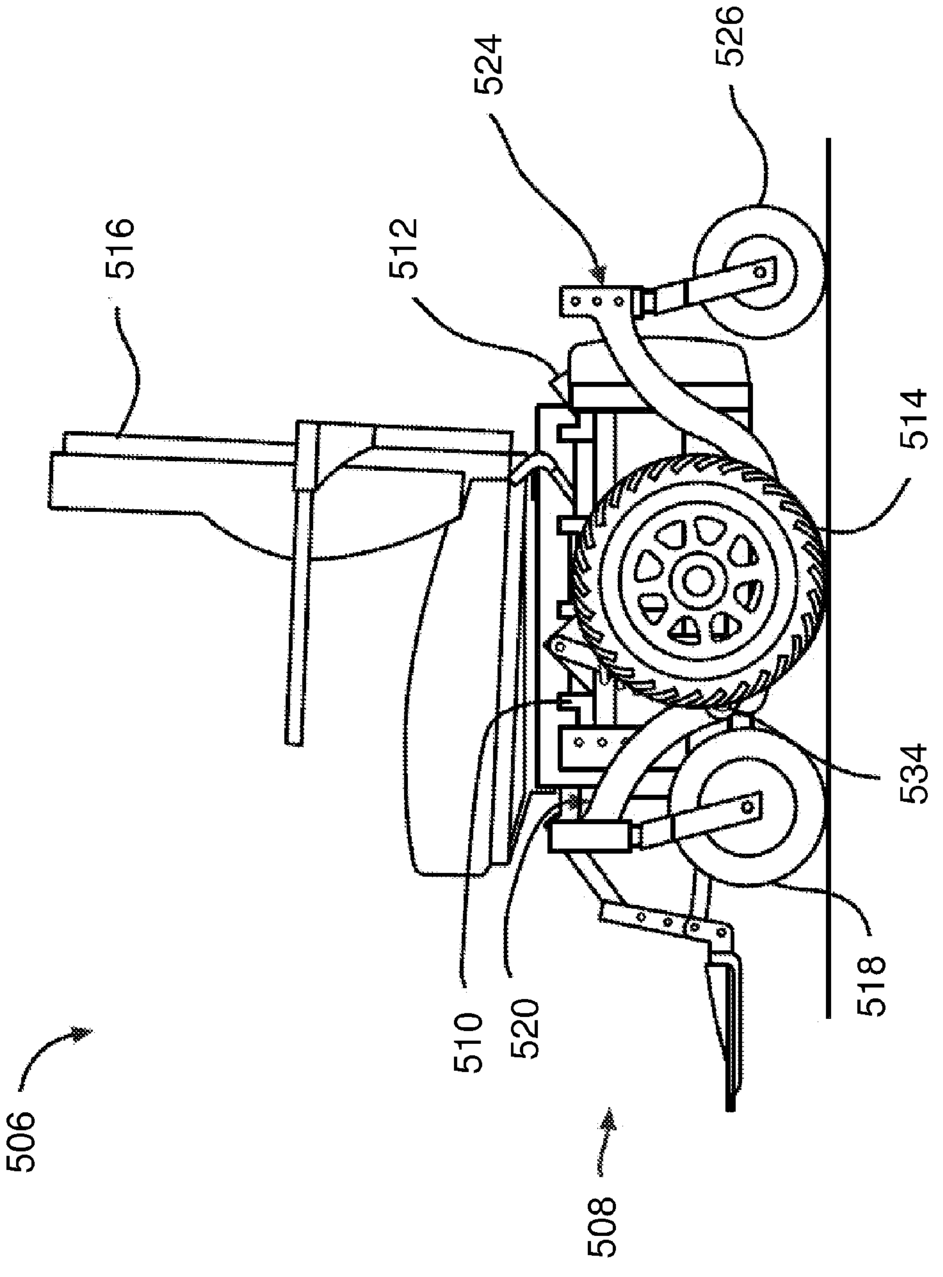
FIG. 7 is a side view in elevation of another embodiment of a personal mobility vehicle configured as a center wheel drive power wheelchair and having a base, similar to the personal mobility vehicle of FIG. 1.
Figure 8:
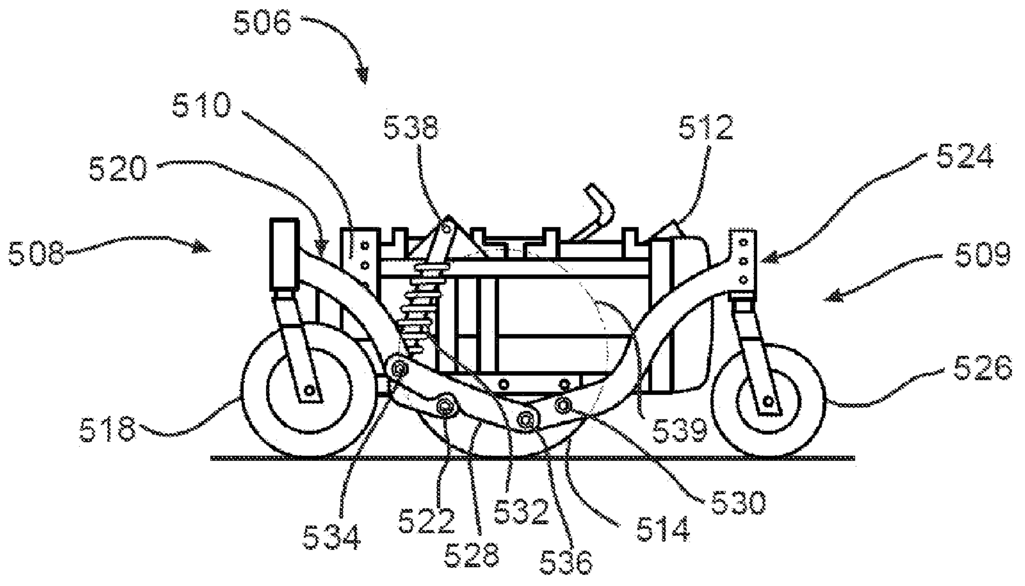
FIG. 8 is a side view in elevation of an alternative embodiment of a base of a wheelchair similar to the base of FIG. 2, with the one of the drive wheels removed for clarity.
Figure 9:
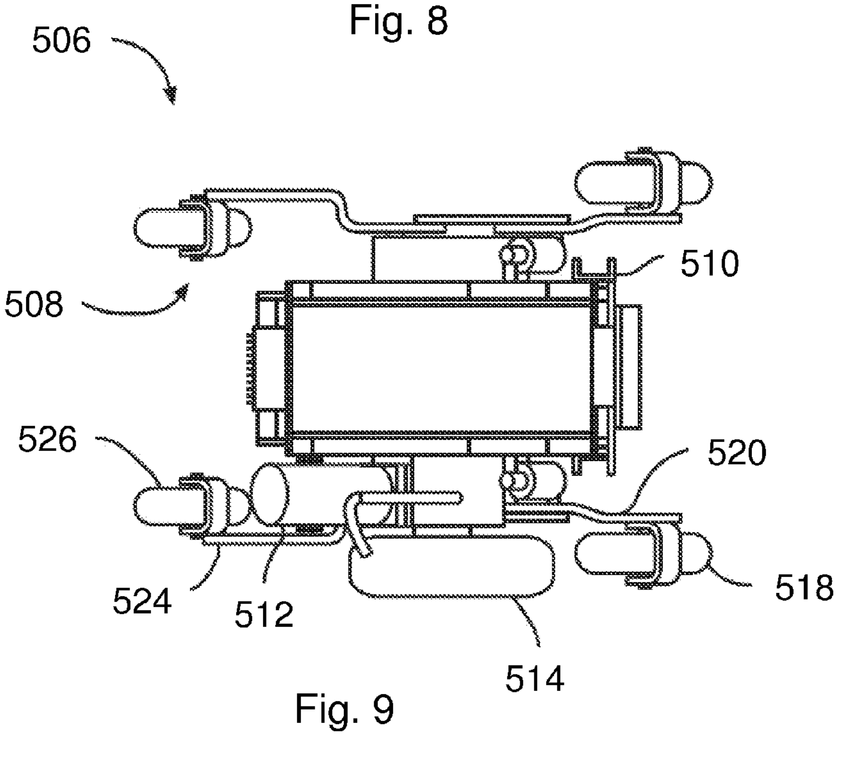
FIG. 9 is a plan view in elevation of the base of FIG. 8.

Referring now to FIGS. 7-9, there is illustrated another embodiment of a center wheel drive power wheelchair, shown generally at 506, and configured with a suspension 508. The wheelchair 506 includes a base 509 and a frame 510 supporting two center drive wheels 514 mounted for rotation and aligned along a horizontal axis, normal to the direction of fore/aft motion, and two drives 512 for powering the center drive wheels 514. The frame 510 supports a seat 516 for the wheelchair occupant. On each side of the wheelchair a front pivot arm 520 is pivotally mounted to the frame 510 at a front pivot point 522. The front pivot arm 520 includes a front caster 518 to support the frame 510. On each side of the wheelchair a rear pivot arm 524 is pivotally mounted to the frame 510 at a rear pivot point 530 as shown in FIG. 8. The rear pivot arm 524 includes a rear caster 526 to support the frame. The embodiment of the center wheel drive power wheelchair, shown in FIGS. 7-12, includes front casters 518 and rear casters 526. However, it should be understood that the term "casters" includes casters, idler wheels and anti-tip wheels. The drive wheels 514 can be mounted from the frame 510 by means of pivot arms, not shown, but such pivot arms are optional.

As shown in FIGS. 8-12, each front pivot arm 520 includes a front link point 534 located to the front of the front pivot point 522. The rear pivot arm 524 includes a rear link point 536 located to the front of the rear pivot point 530. It can be seen that when the front pivot arm 520 pivots upward relative to the frame 510 on the front pivot point 522, the front link point 534 moves up and the front caster 518 is raised. Likewise, when the rear pivot arm 524 pivots relative to the frame 510 on the rear pivot point 530, the rear link point 536 moves down and the rear caster is raised.

The center wheel drive power wheelchair suspension 508 includes a connecting linkage 528 which connects the front pivot arm 520 at the front link point 534 to the rear pivot arm 524 at the rear link point 536. Although the connecting linkage 528 shown in FIGS. 8-12 is a straight member, it should be understood that the connecting linkage 528 may be any means of connecting the front pivot arm 520 at the front link point 534 to the rear pivot arm 524 at the rear link point 536. The connecting linkage 528 is configured in such a way that an upward or downward rotation of one of the pivot arms 520 or 524 about its respective pivot point 522 or 530 causes rotation of the other pivot arm about its pivot point in an opposite rotational direction. Therefore, if the front caster 518 is raised up, the front pivot arm 520 will pivot clockwise, when viewing the left hand side of the wheelchair as shown in the drawings, about its pivot point 522. This will cause the corresponding movement of the rear pivot arm 524 in a counterclockwise rotational movement about its pivot point 530. Counterclockwise rotation of the rear pivot arm 524 causes the rear caster to be raised from the ground. In summary, the connecting linkage 528 connects the front and rear pivot arms 520, 524 to each other in a manner such that an upward or downward rotation of one of the pivot arms about its pivot point causes rotation of the other pivot arm about its pivot point in an opposite rotational direction. Another result of the suspension 8 is that when the front caster wheels 518 are lifted up, the rear caster wheels 526 are also lifted up.

The front and rear pivot arms can be configured so that the ratio of the upward angular rotation of the front pivot arm to corresponding upward angular rotation of the rear pivot arm is approximately 1:1. In other embodiments, the ratio of angular rotation of the front pivot arm to corresponding angular rotation of the rear pivot arm is different from 1:1. For example, the ratio can be greater than 1:1 so that a 30 degree angular rotation of the front arm 520 results in a 20 degree angular rotation of the rear arm 524.

Figure 11:
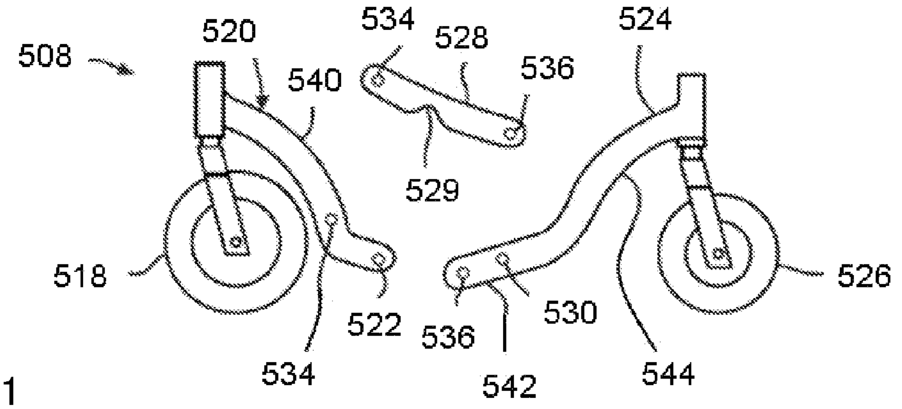
FIG. 11 is an exploded view in elevation of the suspension of the wheelchair.

The connecting linkage 528 can be provided with a notch 529 to conform to the structure of the pivot point apparatus at pivot point 522, as shown in FIG. 11.

Figure 10:
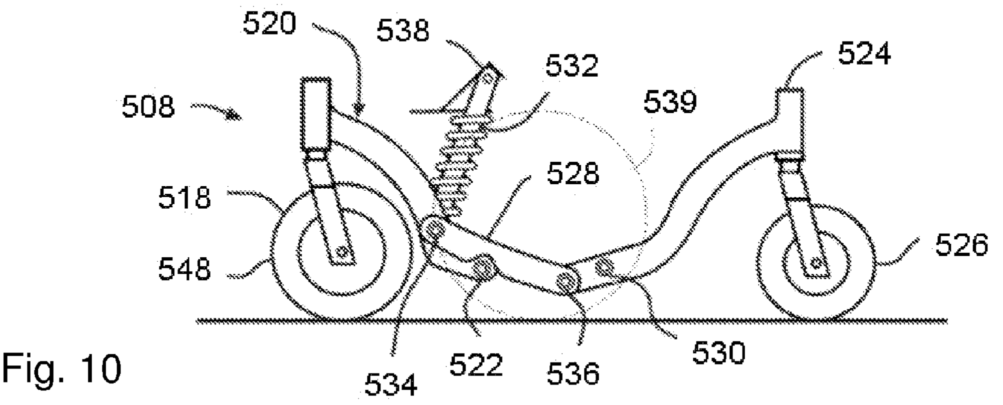
FIG. 10 is a side view in elevation of the suspension of the wheelchair.

An optional feature of the suspension 508 is the use of a resilient member 532, as shown in FIGS. 8 and 10, which is connected to hold or urge the suspension 508 in or to a desired position. In a specific embodiment of the invention, the resilient member is a spring 532 that connects the connecting linkage 528 and the front pivot arm 520, at the front link point 534, to the frame 510. The spring 532 urges the connecting linkage 528 and the front pivot arm 520 toward the frame 510, and hence provides a home position or neutral position for the suspension 508. As various members of the suspension 508 pivot, the spring 532 is stretched (or compressed), thereby biasing the suspension into a neutral position. One end of the spring 532 is connected to the connecting linkage 528 and the front pivot arm 520 at the front link point 534, which is forward of the front pivot point 522, and the other end to the frame 10 at the frame spring point 538. The resilient member 532 provides resistance to movement of the linkage 528 and the front pivot arm 520 relative to the frame 510. It should be understood that the resilient member 532 may be any means of providing resistance or a biasing force to movement of the connecting linkage 528 and the front pivot arm 520 relative to the frame 510. The resilient member 532 need not be connected to the frame 510 at frame spring point 538, but can connect the connecting linkage 528 and the front pivot arm 520 to other members. Also, the spring can be connected solely to the connecting linkage or solely to the front pivot arm 520.

An exploded view of the center wheel drive power wheelchair suspension 508 is shown in FIG. 11. The front pivot arm 520 includes a front pivot arm forward segment 540 located forward of the front pivot point 522. The rear pivot arm 524 includes a rear pivot arm forward segment 542 located forward of the rear pivot point 530 and a rear pivot arm rearward segment 544 located rearward of the rear pivot point 530.

As shown in FIG. 10, the front caster 518, the rear caster 526, and the center drive wheels 514 are normally all in constant contact with the ground. However, it should be appreciated that under normal conditions continuous contact with the ground by the front caster 518 and rear caster 526 is not required for the operation of this suspension system.

In an optional embodiment, the front pivot point 522 and the rear pivot point 530 are located within the outline or envelope 539 of the center drive wheel 514, as shown in FIG. 10, to allow the pivot points to be as close to the ground as possible. The envelope is the region corresponding to the outline of the drive wheel. It is advantageous to locate the pivot points of the linkage arms within the envelope of the center drive wheels 514 because this will minimize ground clearance problems while ensuring the resultant force generated by contacting an obstacle acts toward lifting the caster front.

Figure 12:
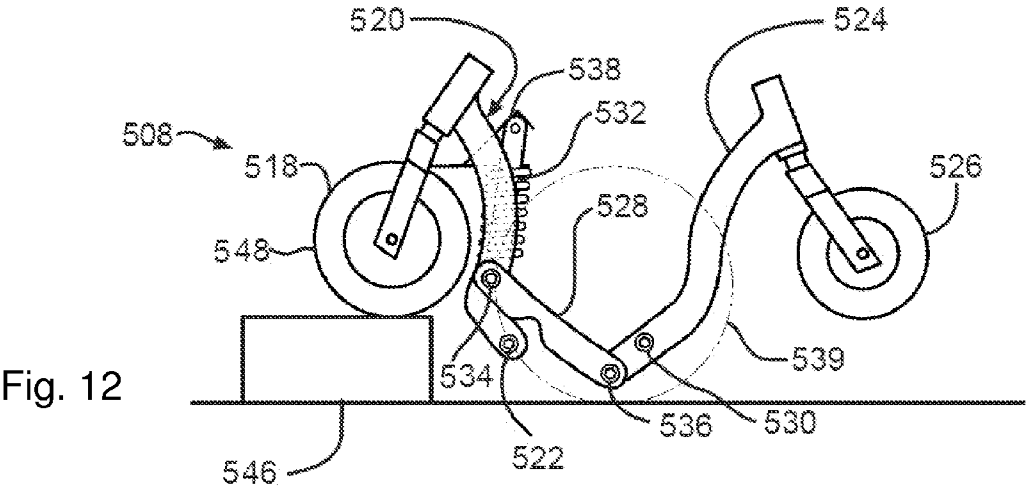
FIG. 12 is a side view in elevation of the suspension as the wheelchair is overcoming an obstacle.

Referring now to FIG. 12, the ability of the center wheel drive power wheelchair 506 to overcome an obstacle will now be described. As the center wheel drive power wheelchair 506 encounters an obstacle 546, the front caster 518 contacts the obstacle 546, and a force $F_{fc}$ is created on the leading edge 548 of the front caster due to the momentum of the wheelchair 506 in the forward direction. Force $F_{fc}$ causes an upward movement of the front caster 518. The upward movement of the front caster causes an upward rotation of the front pivot arm 520 about the front pivot point 522. As the front pivot arm 520 pivots about the front pivot point 522 (clockwise, as shown in FIG. 12), the front pivot arm 520 causes the front link point 534 to rotate in a clockwise direction. As the front link point 534 rotates in a clockwise direction, the connecting linkage 528 connected to the front pivot arm 520 at the front link point 534 also moves in a clockwise rotational direction. Rotational movement of the connecting linkage 528 is resisted by the resilient member 532. As the connecting linkage 528 moves in a clockwise direction, the rear link point 536 moves downward. As the connecting linkage 528 moves in a clockwise direction and the rear link point 36 moves downward, the connected rear pivot arm 524 is forced to rotate (counterclockwise as shown in FIG. 12) about the rear pivot point 30. Counter-clockwise rotation of the rear pivot arm 524 about the rear pivot point 530 results in an upward rotation of the rear pivot arm rearward segment 544. The upward rotation of the rear pivot arm rearward segment 544 results in a lifting of the rear caster 526.

Summarizing the action of the center drive power wheelchair suspension 508, a force on either the front caster 518 or the rear caster 526, results in the lifting of that caster and a rotation of the respective pivot arm. The rotation of the pivot arm about its pivot point results in a movement of the connecting linkage 528, which connects the front pivot arm 520 and the rear pivot arm 524 to each other in a manner such that an upward or downward rotation of one of the pivot arms about its pivot point causes rotation of the other pivot arm about its pivot point in an opposite rotational direction. This action causes the front caster 518 and the rear caster 526 to lift, thereby causing the center drive wheels 514 to maintain contact with the ground. While FIG. 12 describes the ability of the center wheel drive power wheelchair 506 to overcome an obstacle 546 in the forward direction, the center wheel drive power wheelchair 506 has the ability to overcome an obstacle 546 in either the forward or rearward direction.

In the embodiment disclosed in FIGS. 7-12, the connecting linkage 528 is shown as a straight member. However, the connecting linkage 528 can be configured in numerous other shapes. As will be explained below, examples of different configurations of the connecting linkage 528 include a cross-over beam, an elongated member, a gear linkage, rotatable members connected by a belt or chain, a cross-over beam with a third link, an electronic system, a hydraulic system, a pneumatic system, a curved member or any equivalent means.

It can be seen that when the wheelchair encounters rough terrain, where the drive wheel 514 travels over a depression or low spot, the raising of the front and rear wheels 518, 526 will maintain the drive wheels 514 in contact with the ground. It also can be seen that the front caster 518 and the rear caster 526, as well as their respective pivot arms 520 and 524, are independent of the drive wheels 514 and any suspension for the drive wheels.

Figure 13:
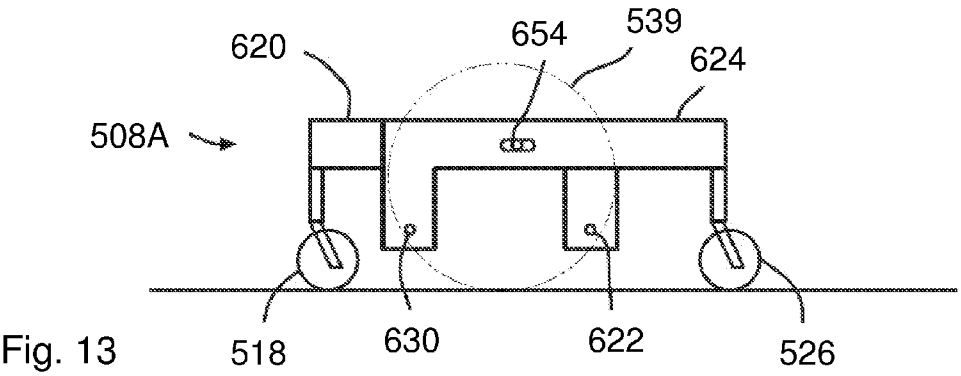
FIG. 13 is a side view in elevation of a cross-over beam configuration of the wheelchair suspension.
Figure 14:
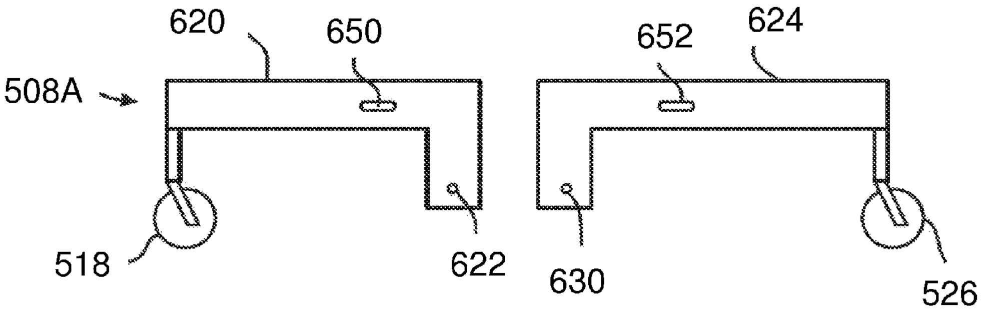
FIG. 14 is an exploded view in elevation of the suspension of FIG. 13.
Figure 15:
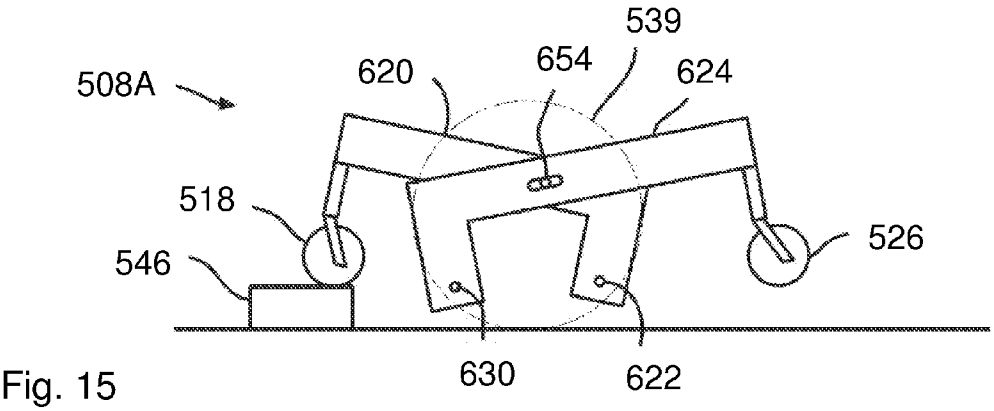
FIG. 15 is a side view in elevation of the suspension of FIG. 13 as the wheelchair is overcoming an obstacle.

In another embodiment of the center wheel drive power wheelchair suspension, as shown in FIGS. 13-15, a suspension 508A is configured in the form of a cross-over beam linkage. In this embodiment, the suspension 508A includes a front cross-over beam 620, which contains a first pin slot 650, and which pivots about a front pivot point 622. The suspension 508A also includes a rear cross-over beam 624, which contains a second pin slot 652, and which pivots about a rear pivot point 630. The front cross-over beam 620 and the rear cross-over beam 624 are connected to each other by a connecting pin 654 that extends into the first pin slot 650 and the second pin slot 652. The connection of the front cross-over beam 620 and the rear cross-over beam 624 by the connecting pin 654 is configured in such a way that an upward or downward rotation of one of the cross-over beams 620 or 624 about its respective pivot point 122 or 130 causes rotation of the other cross-over beam about its pivot point in an opposite rotational direction. Therefore, if the front caster 518 is raised up, such as by an impact with the obstacle 546, the front cross-over beam 620 will pivot in a clockwise direction, when viewing the left hand side of the wheelchair as shown in the drawings, about its pivot point 622. This will cause a corresponding movement of the rear cross-over beam 624 in a counterclockwise rotational movement about its pivot point 630. Counterclockwise rotation of the rear cross-over beam 624 causes the rear caster 526 to be raised from the ground. The pin 654 can be any mechanism suitable to connect the slots 650, 652 together to allow the beams 620 and 624, respectively, to be connected in a pivotable manner. For ease of description, similar part numbers will be used in describing similar parts in the various embodiments.

Figure 16:
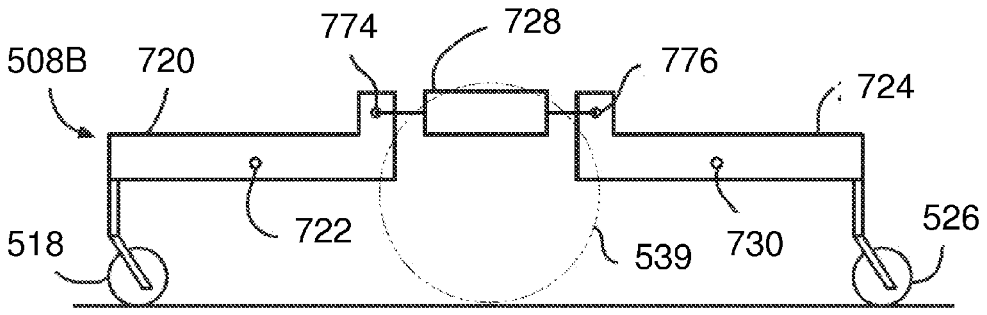
FIG. 16 is a side view in elevation of an electronic configuration of the wheelchair suspension.
Figure 17:
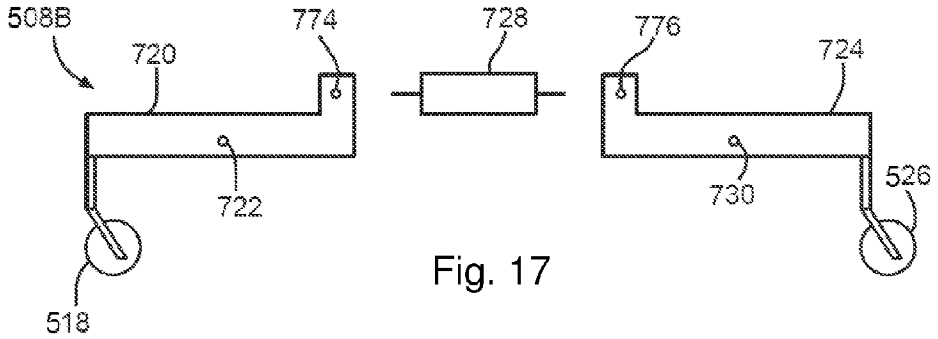
FIG. 17 is an exploded view in elevation of the suspension of FIG. 16.
Figure 18:
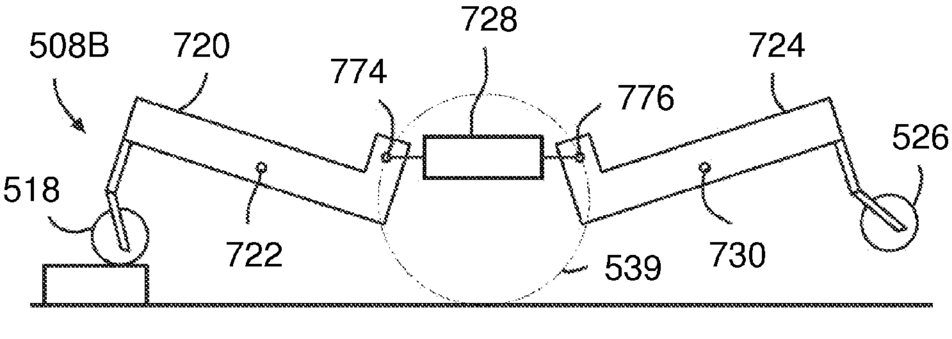
FIG. 18 is a side view in elevation of the suspension of FIG. 16 as the wheelchair is overcoming an obstacle.

In another embodiment of the center wheel drive power wheelchair suspension, as shown in FIGS. 16-18, a suspension 508B has an electronic linkage configuration. In this embodiment, the suspension 508B includes a front pivot arm 720 that is mounted for pivoting relative to the frame 510 about front pivot point 722. The front pivot arm 720 includes a connection point 774. The suspension 508B also includes a rear pivot arm 724 mounted for pivoting relative to the frame 510 about a rear pivot point 730. The rear pivot arm 724 contains a rear connection point 776. The front pivot arm 720 and the rear pivot arm 724 are connected to each other by an electronic linkage 728 at the front connection point 774 and the rear connection point 776, respectively. The electronic linkage 728 is configured to sense the upward or downward rotation of one of the pivot arms 720 or 724 about its respective pivot point 722 or 730 and subsequently to cause rotation of the other pivot arm about its pivot point in an opposite rotational direction. Therefore, if the front caster 518 is raised up, such as by encountering an obstacle 546, the front pivot arm 720 will pivot in a clockwise direction. Such rotation is sensed by the electronic linkage 728, about its pivot point 722 and the electronic linkage 728 will cause the corresponding movement of the rear pivot arm 724 in a counterclockwise rotational movement about its pivot point 730. Counterclockwise rotation of the rear pivot arm 724 causes the rear caster 26 to be raised from the ground. The electronic linkage can be a mechanism that senses the rearward or downward movement of connection point 774, or forward or downward motion of the connection point 776. The electronic linkage 728 can be freely suspended between the arm 720 and the arm 724. Alternatively, it can be connected to the frame 510 in any suitable manner. The connection between the arms 720, 724 and the electronic linkage can be purely electronic, in which case an inclinometer or other similar device can be incorporated into the system to communicate the presence of a pivoting motion for one of the arms 720, 724.

Other mechanisms can be used for sensing the motion or rotation of one of the arms 720 and 724, and causing the other of the arms to pivot. Although the linkage 728 shown in FIGS. 16-18 has been described as an electronic linkage, it should be understood that the linkage 728 may be any means of sensing rotational movement of rotational movement of one of the pivot arms 720 or 724 and to subsequently cause rotation of the other pivot arm 720 or 724 including a hydraulic system or a pneumatic system. For example, the system could include solenoids activated by pivoting of one of the arms 720, 724, with the other arm provided with a counter-rotating pivoting motion by the action of a motor. Optionally, the electronic linkage 728 includes a resilient member, not shown, to hold or urge the suspension 8B in or to a desired position. Also, the electronic linkage 728 itself can act as a resilient member to hold or urge the suspension 508B in or to a desired position. It should be understood that a separate resilient member, comprising any means of holding or urging the suspension 508B in or to a desired position, may be used.

Figure 19:
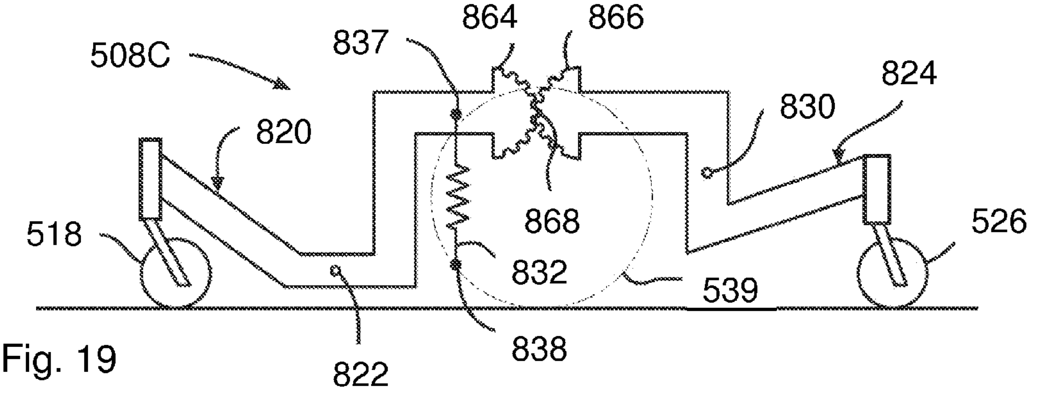
FIG. 19 is a side view in elevation of a gear linkage configuration of the wheelchair suspension.
Figure 20:
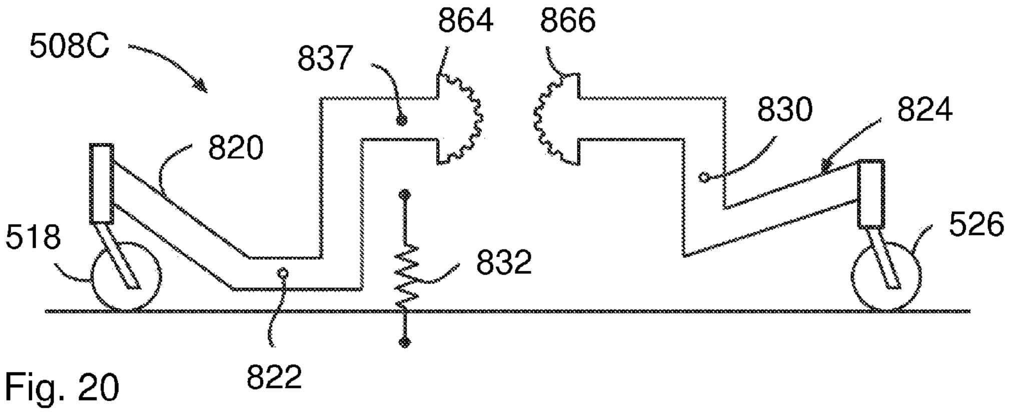
FIG. 20 is an exploded view in elevation of the suspension of FIG. 19.
Figure 21:
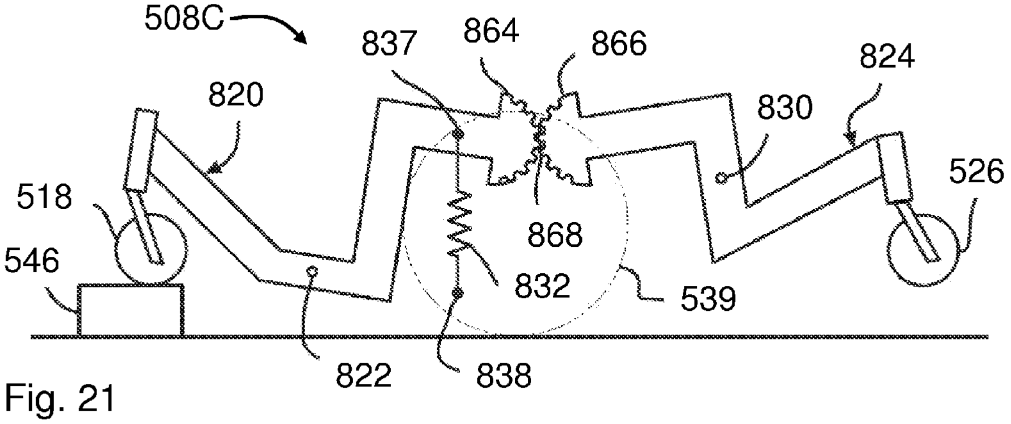
FIG. 21 is a side view in elevation of the suspension of FIG. 19 as the wheelchair is overcoming an obstacle.

In another embodiment of the center wheel drive power wheelchair suspension, as shown in FIGS. 19-21, a suspension 508C includes a gear linkage. In this embodiment, the suspension 508C includes a front pivot arm 820 which contains a front gear rack 864, and which pivots about a front pivot point 822. The suspension 508C also includes a rear pivot arm 824 containing a rear gear rack 866, which pivots about the rear pivot point 830. The front pivot arm 820 and the rear pivot arm 824 are connected to each other as the front gear rack 864 engages the rear gear rack 866 at the gear rack intersection 868. The connection of the front gear rack 864 and the rear gear rack 866 at the gear rack intersection is configured in such a way that an upward or downward rotation of one of the pivot arms 820 or 824 about its respective pivot point 822 or 830 causes rotation of the other pivot arm about its pivot point in an opposite rotational direction. Therefore, if the front caster 18 is raised up, such as by encountering an obstacle 546, the front pivot arm 820 will pivot in a clockwise direction, when viewing the left hand side of the wheelchair as shown in the drawings, about its pivot point 822. This will cause the corresponding movement of the rear pivot arm 824 in a counterclockwise rotational movement about its pivot point 830. Counterclockwise rotation of the rear pivot arm 824 causes the rear caster 526 to be raised from the ground. An optional feature of the suspension 508C is the use of a resilient member 832, which is connected to the front pivot arm 820 at the spring point 837 and to the frame 510 at the frame spring point 838. The resilient member 832 is configured to hold or urge the suspension 508C in or to a desired or neutral position. Although the resilient member 832 shown in FIGS. 19-21 is a spring, it should be understood that the resilient member 832 may be any means of holding or urging the suspension 508C in or to a desired position. It is to be understood that the gear mechanism with gear racks 864, 866 can be any mechanism suitable for causing rotation or pivoting of one of the arms 820, 824 in response to the pivoting of the other arm.

Figure 22:
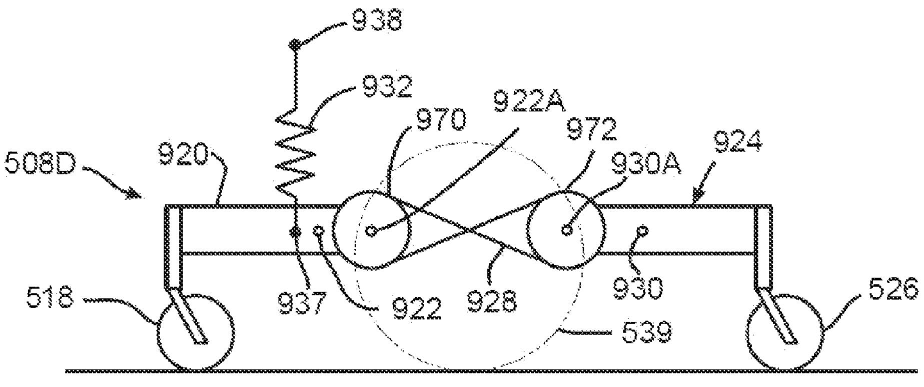
FIG. 22 is a side view in elevation of a rotating members configuration of the wheelchair suspension.
Figure 23:
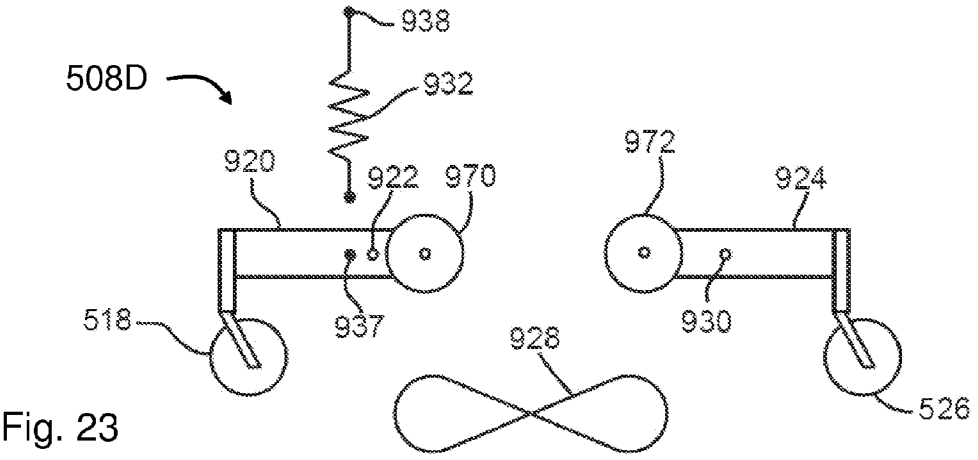
FIG. 23 is an exploded view in elevation of the suspension of FIG. 22.
Figure 24:
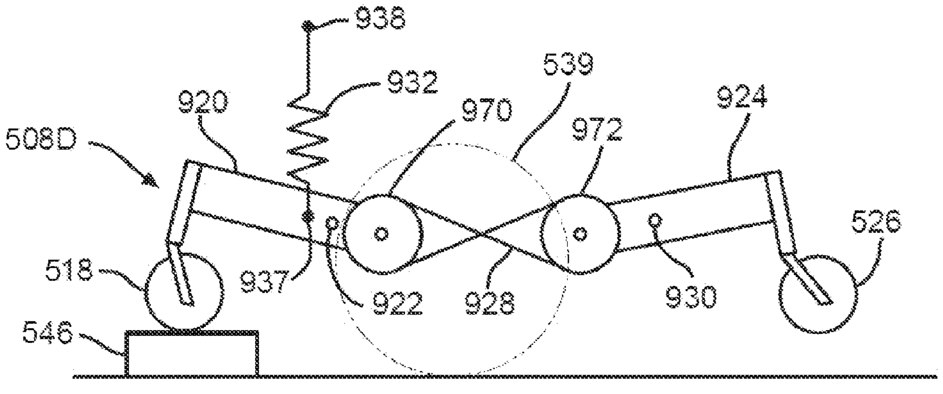
FIG. 24 is a side view in elevation of the suspension of FIG. 22 as the wheelchair is overcoming an obstacle.

As shown in FIGS. 22-24, a suspension 508D for the center wheel drive power wheelchair can be configured with belts, chains or other power transmission members to tlc together the rotation or pivoting of the suspension members. In this embodiment, the suspension 508D includes a front pivot arm 920, which contains or is connected to a front pulley 970. The front pivot arm is pivotally mounted at front pivot point 922 for pivoting with respect to the frame. The suspension 508D also includes a rear pivot arm 924 containing a rear pulley 972. The rear pivot arm 924 is mounted for pivoting with respect to the frame 510 about the rear pivot point 930. The front pivot arm 920 and the rear pivot arm 924 are connected to each other by a belt 928 that engages the front pulley 970 and the rear pulley 972. The connection of the front pulley 970 and the rear pulley 972 by the belt 928 is configured in such a way that an upward or downward rotation of one of the pivot arms 920 or 924 about its respective pivot point 922 or 930 causes rotation of the other pivot arm about its pivot point in an opposite rotational direction. Therefore, if the front caster 518 is raised up, such as would occur if an obstacle 546 is encountered, the front pivot arm 920 will pivot in a clockwise direction, when viewing the left hand side of the wheelchair as shown in the drawings, about its pivot point 922 and cause the corresponding movement of the rear pivot arm 924 in a counterclockwise rotational movement about its pivot point 930. Counterclockwise rotation of the rear pivot arm 924 causes the rear caster 526 to be raised from the ground. While the suspension 508D is shown configured with the belt 928 to connect the front pulley 970 with the rear pulley 972, it should be understood that any transmission means, such as a chain or cord, can be used to transmit rotation from the pulleys 970 and 972 to each other.

An optional feature of the suspension 508D is the use of a resilient member 932 which is connected between the suspension 508D and the frame 510. A resilient member, such as a spring 932, connects the front pivot arm 920 at the spring point 937 and to the frame 510 at the frame spring point 938. The spring 932 is configured to hold or urge the suspension 508D in or to a desired position. It should be understood that the spring 932 may be any means, such as an elastic member or elastic band, capable of holding or urging the suspension 508D in or to a desired position.

Although the suspension 508D shown in FIGS. 22-24 illustrates the pivot arms 920 and 924 as pivoting on pivot points 922 and 930 respectively, the arms could alternatively be set up as pivoting at pivot points 922A and 930A, which are positioned at the center of the pulleys 970, 972.

Figure 25:
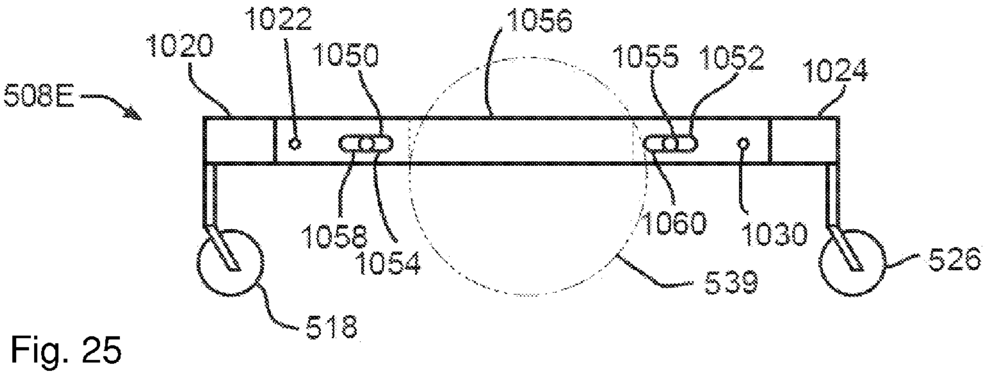
FIG. 25 is a side view in elevation of an elongated link configuration of the wheelchair suspension.
Figure 26:
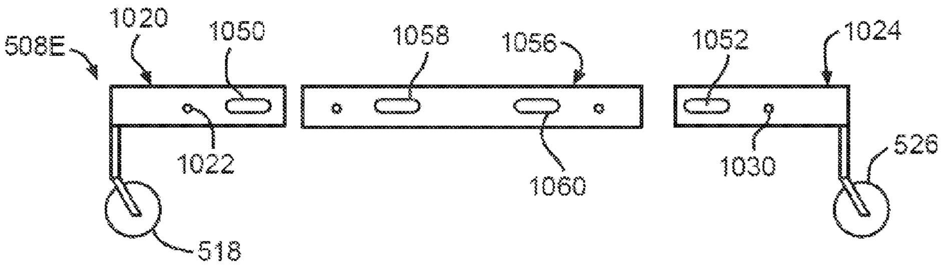
FIG. 26 is an exploded view in elevation of the suspension of FIG. 25.
Figure 27:
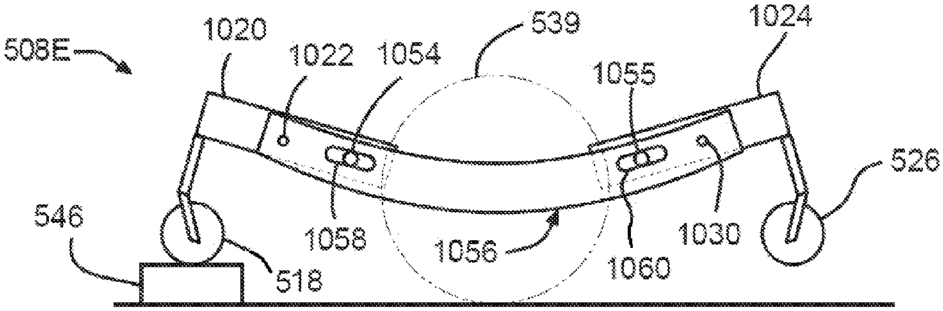
FIG. 27 is a side view in elevation of the suspension of FIG. 25 as the wheelchair is overcoming an obstacle.

In another suspension of the center wheel drive power wheelchair, as shown in FIGS. 25-27, a suspension 508E includes a linkage in the form of an elongated member. In this embodiment, the suspension 508B includes a front pivot arm 1020 which contains a first pin slot 1050. The front pivot arm 1020 pivots about a front pivot point 1022. The suspension 508E also includes a rear pivot arm 1024 which contains a second pin slot 1052, and which pivots about a rear pivot pin 1030. The front pivot arm 1020 and the rear pivot arm 1024 are connected to each other by an elongated member 1056. The elongated member 1056 is rotatably mounted at the front pivot point 1022 and the rear pivot point 1030. The elongated member 1056 is also connected to the front pivot arm 1020 by a first link pin 1054 which extends through the first pin slot 1050 in the front pivot arm 1020, and through the front slot 1058 in the elongated member 1056. Similarly, the elongated member 1056 is connected to the rear pivot arm 1024 by a second link pin 1055 which extends through the second pin slot 1052 in the rear pivot arm 1024, and through the rear slot 1060 in the elongated member 1056.

The elongated member 1056 is a flexible member. The connection of the elongated member 1056 to the front pivot arm 1020 and to the rear pivot arm 1024 by the link pins 1054 and 1055 is configured in such a way that an upward or downward rotation of one of the pivot arms 1020 or 1024 about its respective pivot point 1022 or 1030 causes a movement or displacement of the elongated member 1056 that in turn causes a rotation of the other pivot arm about its pivot point in an opposite rotational direction. The movement or displacement of the elongated member 1056 can be a bending due to the torque or bending forces applied by the upward movement of the front arm 1020 or rear arm 1024. Therefore, if the front caster 518 is raised up, such as shown in FIG. 27 where the wheelchair 506 has encountered an obstacle 546, the front pivot arm 1020 will pivot in a clockwise direction, when viewing the left hand side of the wheelchair as shown in the drawings, about its pivot point 1022. This causes a downward flexing or rotation of the elongated member and causes the corresponding movement of the rear pivot arm 1024 in a counterclockwise rotational movement about its pivot point 1030. Counterclockwise rotation of the rear pivot arm 1024 causes the rear caster 526 to be raised from the ground. In this embodiment of the invention, the elongated member 1056 connects the front pivot arm 1020 and the rear pivot arm 1024 as well as acts as a resilient member in the suspension 508E by resisting motion and returning the system to a neutral position as it flexes.

Figure 28:
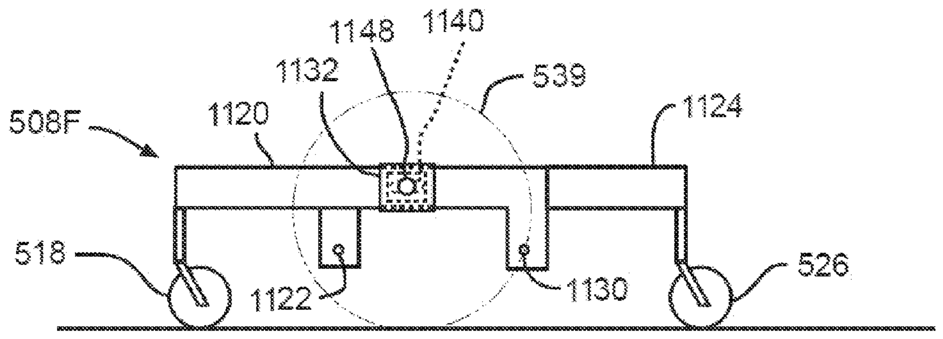
FIG. 28 is a side view in elevation of a third link configuration of the wheelchair suspension.
Figure 29:
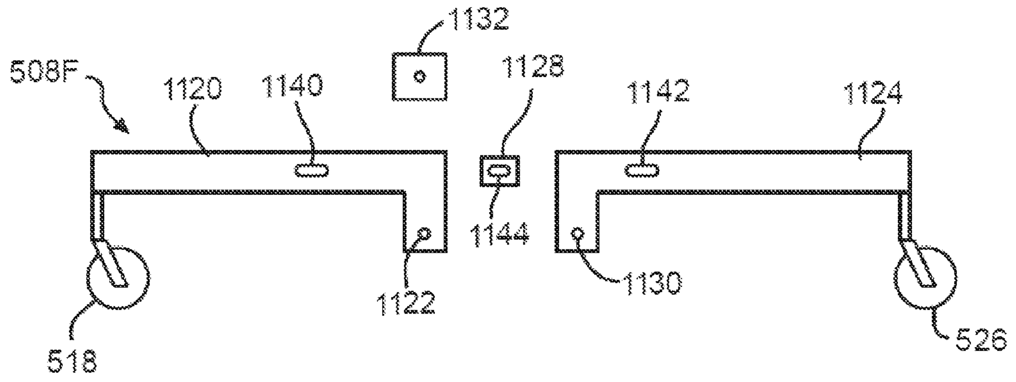
FIG. 29 is an exploded view in elevation of the suspension of FIG. 28.
Figure 30:
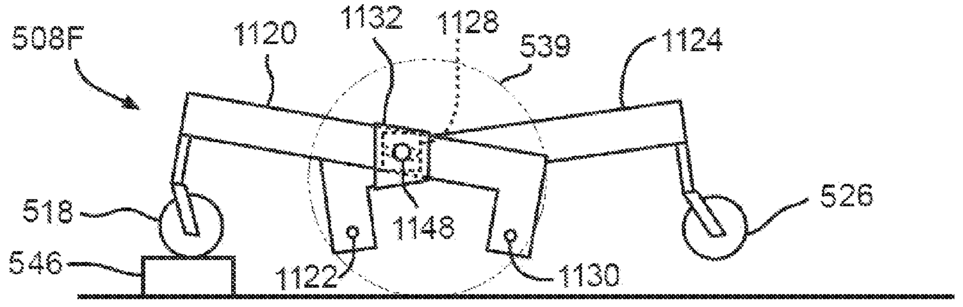
FIG. 30 is a side view in elevation of the suspension of FIG. 28 as the wheelchair is overcoming an obstacle.

As shown in FIGS. 28-30 a center wheel drive power wheelchair suspension 508F includes a cross-over beam linkage with a resilient connection and an optional third link. In this embodiment, the suspension 508F includes a front cross-over beam 1120 which pivots about a front pivot point 1122. The suspension 508F also includes a rear cross-over beam 1124 which pivots about a rear pivot point 1130. The front cross-over beam 1120 and the rear cross-over beam 1124 are optionally connected to each other by a third link 1128. The front crossover beam 1120 includes an elongated slot 1140, and the rear crossover beam includes a corresponding elongated slot 1142. The third link 1128 also includes an elongated slot 1144. When the front cross-over beam 1120 and the rear cross-over beam 1124 are assembled with the third link 1128, the elongated slots 1140, 1142 and 1144 are all aligned and held in a connected configuration by a linking pin 1148.

The connection of the front cross-over beam 1120 and the rear cross-over beam 1124 by the third link 1128 is configured in such a way that an upward or downward rotation of one of the cross-over beams 1120 or 1124 about its respective pivot point 1122 or 1130 causes rotation of the other cross-over beam about its pivot point in an opposite rotational direction. Therefore, if the front caster 518 is raised up, as would be the case upon impact with an obstacle 546, the front cross-over beam 1120 will pivot in a clockwise direction, when viewing the left hand side of the wheelchair as shown in the drawings, about its pivot point 1122 and cause the corresponding movement of the rear cross-over beam 1124 in a counterclockwise rotational movement about its pivot point 1130. Counterclockwise rotation of the rear cross-over beam 1124 causes the rear caster 526 to be raised from the ground.

In an alternate configuration of the suspension 508F, a resilient member, such as an elastic band 1132, can be positioned around the front and rear cross over beams 1120, 1124, to hold them together and urge them into a neutral position. When the elastic band or other resilient member is employed, the optional third link is not necessary.

Figure 31:
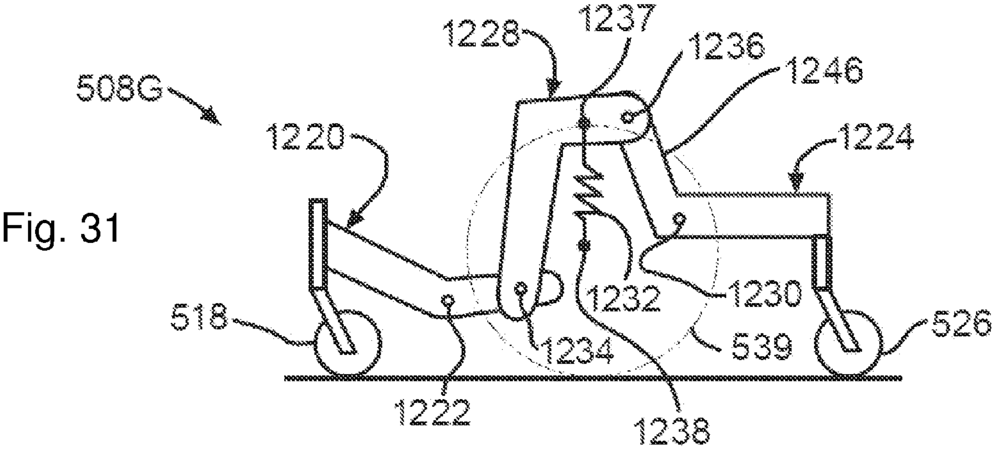
FIG. 31 is a side view in elevation of an angled link configuration of the wheelchair suspension.
Figure 32:
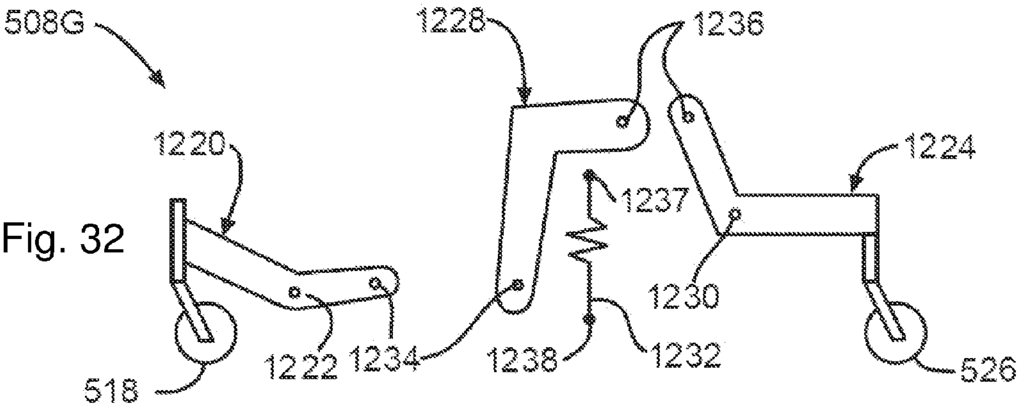
FIG. 32 is an exploded view in elevation of the suspension of FIG. 31.
Figure 33:
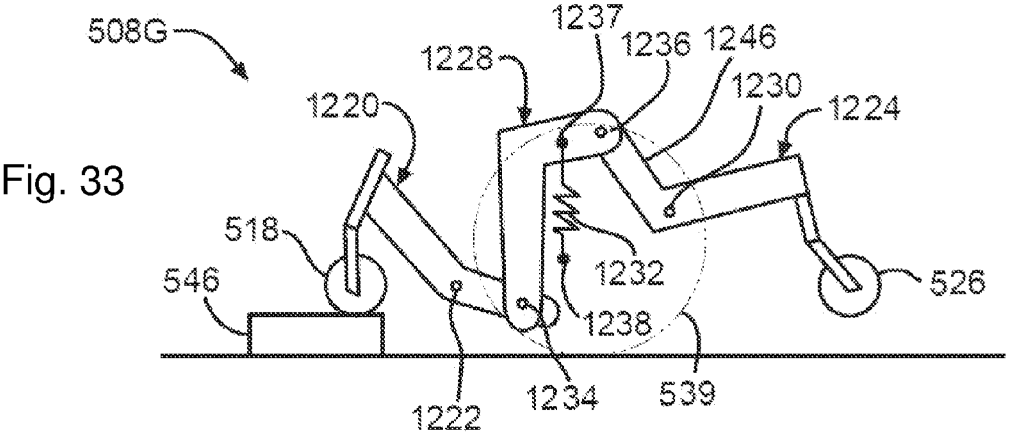
FIG. 33 is a side view in elevation of the suspension of FIG. 31 as the wheelchair is overcoming an obstacle.

In yet another suspension configuration, as shown in FIGS. 31-33, the suspension 508G includes a curved member linkage. In this configuration the suspension 508G includes a front pivot arm 1220 which contains a front link point 1234, with the front pivot arm 1220 being configured to pivot about a front pivot point 1222. The suspension 508G also includes a rear pivot arm 1224 containing a rear link leg 1246. The rear pivot arm is mounted to pivot about the rear pivot point 1230. The front pivot arm 1220 and the rear pivot arm 1224 are connected to each other by a connecting linkage 1228. The connecting linkage 1228 connects to the front pivot arm 1220 at the front link point 1234 and to the rear pivot arm 1224 at the rear link leg 1246. The connection of the front pivot arm 1220, the rear pivot arm 1224 and the connecting linkage 1228 is configured in such a way that an upward or downward rotation of one of the pivot arms 1220 or 1224 about its respective pivot point 1222 or 1230 causes rotation of the other pivot arm about its pivot point in an opposite rotational direction. Therefore, if the front caster 518 is raised up, the front pivot arm 1220 will pivot in a clockwise direction, when viewing the left hand side of the wheelchair as shown in the drawings, about its pivot point 1222. This will cause the corresponding movement of the rear pivot arm 1224 in a counterclockwise rotational movement about its pivot point 1230. Counterclockwise rotation of the rear pivot arm 1224 causes the rear caster 526 to be raised from the ground.

As shown, the connecting linkage 1224 is a curved member. However, the connecting member 1224 can be of any shape or form that connects the front pivot arm 1220 to the rear pivot arm 1224 and can transmit rotational movement of one pivot arm to an opposite rotational movement in the other pivot arm. An optional feature of the suspension 508G is the use of a resilient member 1232, which is connected at one end to the front pivot arm 1220 at the spring point 1238, and at the other end to the frame 510. In this embodiment, the resilient member 1232 is a spring which is configured to hold or urge the suspension 508G in or to a desired position, but it should be understood that the resilient member 1232 can be any means to hold or urge the suspension 508G in or to a desired position.

While the various suspension configurations above illustrate only the left side of the suspension, it is to be understood that the suspension actually includes both a left and a right suspension. Also, an optional feature of any of the suspensions described above is the use of a resilient member configured to hold or urge the suspension in or to a desired position. The resilient member can be a spring, an elastic band, or any means of holding or urging the suspension 508 in or to a desired position.

It is to be understood that the term “caster” includes idler wheels as well as casters. Also, the mid-wheel drive wheel, which is usually positioned underneath the approximate center of gravity of the wheelchair and occupant, can be positioned anywhere between the front caster 518 and the rear caster 526. Further, although the suspension systems disclosed are configured so that when the front pivot arm 520 is raised the rear pivot arm 524 is also raised, the suspension 528 can be configured in an opposite manner, wherein when the front arm 520 is raised, the rear pivot arm is lowered relative to the frame. Also, the suspension 8 can be configured so that the rear pivot arms can be disconnected and therefore not mounted for pivoting in response to the pivoting of the front pivot arm. In yet another configuration, the connecting linkage 528 is configured in an adjustable manner so that adjustments in the suspension 508 can be readily made. The adjustment feature can include a telescoping configuration, an angle change configuration, or any other configuration that allows adjustability. Also, although the suspension 508 has been described in terms of a front pivot arm 520 with front caster 518, a rear pivot arm 524 with rear caster 526, and a drive wheel, typical use on a wheelchair will include such a suspension on each side of the wheelchair (left and right), so that there is a pair of front pivot arms 520 with front casters 518, a pair of rear pivot arms 524 with rear caster 526, and a pair of drive wheels.

The principle and mode of operation of this invention have been described in its preferred embodiments. However, it should be noted that this invention may be practiced otherwise than as specifically illustrated and described without departing from its scope.

What is claimed is:

1. A suspension system for a wheelchair comprising;

a frame;

a suspension unit including a front suspension arm pivotally supported on the frame and a front caster wheel mounted on the front suspension arm for relative pivotal movement therewith; and a torque arm pivotally supporting a drive unit relative to the frame, the torque arm including a suspension lock portion, the suspension lock portion selectively engaging the suspension unit such that when the drive unit pivots relative to the frame the suspension lock portion becomes disengaged from the suspension unit, thereby enabling the front suspension arm to pivot relative to the frame.

2. The suspension system of claim 1 wherein the selective engagement of the suspension unit by the suspension lock portion involves engagement of the front suspension arm.

3. The suspension system of claim 1 wherein the front suspension arm includes a knob extending from the front suspension arm, and the suspension lock portion selectively engaging the knob.

4. The suspension system of claim 1 wherein the suspension unit includes a rear suspension arm that is pivotally connected to the front suspension arm for concurrent movement.

5. The suspension system of claim 4 wherein a link arm pivotally connects the rear suspension arm to the front suspension arm for concurrent movement.

6. The suspension system of claim 4 wherein a pair of link arms are connected for concurrent movement of the front and rear suspension arms.

7. The suspension system of claim 4 wherein the suspension lock portion selectively engages the rear suspension arm.

8. A suspension system for a wheelchair comprising;

a base having a frame;

a drive unit having a motor and a gear box, the drive unit connected to a drive wheel for rotation of the drive wheel relative to the base, the drive unit supported by a torque arm for pivotal movement relative to the frame, the torque arm including a suspension lock portion; and a suspension unit including a front suspension arm pivotally supported on the frame and a front caster wheel mounted on the front suspension arm for relative pivotal movement, the suspension lock portion of the torque arm being movable upon rotation of the torque arm into and out of selective engagement with the suspension unit such that torque applied to the drive wheel selectively disengages the suspension lock portion from the suspension unit.

9. The suspension system of claim 8 wherein the suspension unit is adapted to move in reaction to terrain irregularities when the suspension lock portion disengages from the suspension unit.

10. The suspension system of claim 8 wherein the torque applied to the drive wheel exerts a torque reaction onto the torque arm, the torque reaction selectively disengaging the suspension lock portion from the suspension unit such that the front suspension arm can move in reaction to obstructions encountered by the front caster wheel.

11. The suspension system of claim 8 wherein a motor stop is positioned between the frame and the drive unit, and the front suspension arm includes a suspension stop.

12. The suspension system of claim 11 wherein the suspension stop is a bearing.

13. The suspension system of claim 11 wherein the motor stop is adjustable to provide a gap between the suspension lock portion and the suspension stop such that the front suspension arm can move in a limited range of motion in reaction to obstructions encountered by the front caster wheel.

14. A wheelchair having front and rear caster wheels, drive wheels, a seat, a control device, and the suspension system of claim 8.

15. A suspension system for a wheelchair comprising;

a base unit;

a front caster wheel mounted on a front suspension arm that is pivotally mounted to the base unit; and a torque arm supporting a drive wheel and a motor, the torque arm being pivotally mounted to the base unit in a manner that enables the torque arm to pivot when the motor generates torque, the torque arm being configured for selective engagement with the front suspension arm to selectively block pivoting of the front suspension arm.

16. The suspension system of claim 15 wherein a suspension lock portion of the torque arm normally contacts the front suspension arm, thereby normally preventing upward pivotal movement of the front suspension arm, and wherein torque generated by the motor causes the torque arm to pivot, thereby allowing the front suspension arm to rotate.

* * * * *